(12) United States Patent
Kennedy et al.

(10) Patent No.: US 9,609,226 B2
(45) Date of Patent: Mar. 28, 2017

(54) LOCATION-TAG CAMERA FOCUSING SYSTEMS

(71) Applicant: Free Focus Systems LLC, Scottsdale, AZ (US)

(72) Inventors: Douglas R Kennedy, Scottsdale, AZ (US); Stephen A Kennedy, Scottsdale, AZ (US); Phillip B Kennedy, Phoenix, AZ (US)

(73) Assignee: Free Focus Systems, Scottsdale, AZ (US)

( * ) Notice: Subject to any disclaimer, the term of this patent is extended or adjusted under 35 U.S.C. 154(b) by 0 days.

(21) Appl. No.: 14/541,621

(22) Filed: Nov. 14, 2014

(65) Prior Publication Data

US 2015/0138384 A1    May 21, 2015

Related U.S. Application Data

(60) Provisional application No. 61/904,968, filed on Nov. 15, 2013, provisional application No. 61/921,337, filed on Dec. 27, 2013.

(51) Int. Cl.
*H04N 5/232* (2006.01)
*G01S 5/02* (2010.01)
*G01S 19/46* (2010.01)

(52) U.S. Cl.
CPC ....... *H04N 5/23296* (2013.01); *G01S 5/0263* (2013.01); *G01S 19/46* (2013.01); *H04N 5/232* (2013.01); *H04N 5/23206* (2013.01); *H04N 5/23212* (2013.01); *H04N 5/23216* (2013.01); *H04N 5/23293* (2013.01)

(58) Field of Classification Search
CPC ............... H04N 5/225; H04N 5/23212; H04N 5/23216; H04N 5/23293; H04N 5/23296; G01S 3/7864; G01S 5/0263; G01S 19/46; G02B 7/28
USPC ..... 348/14.05, 14.16, 157, 169–172, 207.99, 348/211.99–211.14, 345–357
See application file for complete search history.

(56) References Cited

U.S. PATENT DOCUMENTS

| 5,315,340 | A | * | 5/1994 | Hirasawa | ........... H04N 5/23212 348/E5.045 |
| 5,361,115 | A | * | 11/1994 | Ohtsuka | .................. G01S 3/785 318/640 |
| 5,995,763 | A | * | 11/1999 | Posa | ........................ G02B 7/40 396/105 |
| 7,388,496 | B1 | | 6/2008 | Halcrow | |
| 7,561,786 | B1 | | 7/2009 | Black | |
| 8,162,486 | B2 | | 4/2012 | Borger | |

(Continued)

FOREIGN PATENT DOCUMENTS

JP    2007058680    8/2007

OTHER PUBLICATIONS

PCT/US2014/065827 International Search Report dated Feb. 19, 2015, 15 pgs.

*Primary Examiner* — Dennis Hogue
(74) *Attorney, Agent, or Firm* — Spencer Fane LLP

(57) ABSTRACT

A system for improved camera focusing systems using subject location tags. More particularly, the disclosed subject matter relates to providing a system comprising camera accessories and in-lens technologies that allows for the continuous, automated focus of a subject by measuring the distance between the camera and a subject that has been "tagged" with a locator beacon.

36 Claims, 12 Drawing Sheets

(56) References Cited

U.S. PATENT DOCUMENTS

| | | |
|---|---|---|
| 8,310,652 B2 | 11/2012 | Kanayama |
| 8,334,775 B2 | 12/2012 | Tapp |
| 9,094,611 B2* | 7/2015 | Kennedy ............ H04N 5/23206 |
| 2003/0011692 A1* | 1/2003 | Shore ...................... G03B 13/20 |
| | | 348/240.3 |
| 2004/0046938 A1* | 3/2004 | Gero ........................ G02B 7/28 |
| | | 352/140 |
| 2005/0007553 A1* | 1/2005 | Romanoff ............. B66F 11/048 |
| | | 352/243 |
| 2005/0011959 A1 | 1/2005 | Grosvenor |
| 2006/0050929 A1 | 3/2006 | Rast |
| 2006/0171705 A1* | 8/2006 | Slupe ..................... F16M 11/08 |
| | | 396/427 |
| 2006/0197840 A1* | 9/2006 | Neal ..................... G01S 3/7864 |
| | | 348/169 |
| 2007/0096909 A1 | 5/2007 | Lally |
| 2007/0133979 A1* | 6/2007 | Lackey ................. F16M 11/10 |
| | | 396/428 |
| 2008/0002031 A1* | 1/2008 | Cana ..................... G01S 5/0027 |
| | | 348/208.14 |
| 2008/0088703 A1* | 4/2008 | Dollahite ............... H04N 5/232 |
| | | 348/169 |
| 2008/0225137 A1* | 9/2008 | Kubo .................. H04N 5/23203 |
| | | 348/231.2 |
| 2008/0225234 A1* | 9/2008 | Bauer ...................... G03B 3/12 |
| | | 352/140 |
| 2009/0322489 A1 | 12/2009 | Jones |
| 2010/0007738 A1 | 1/2010 | Lehnert |
| 2010/0097221 A1 | 4/2010 | Kreiner |
| 2011/0181766 A1* | 7/2011 | Hashiguchi ............ H04N 5/222 |
| | | 348/333.12 |
| 2012/0019702 A1* | 1/2012 | Richter .................... G03B 3/12 |
| | | 348/333.02 |
| 2012/0195574 A1 | 8/2012 | Wallace |
| 2012/0300079 A1 | 11/2012 | Hale |
| 2012/0313759 A1 | 12/2012 | Markwitz |
| 2013/0228620 A1* | 9/2013 | Ahern .................. G01C 15/002 |
| | | 235/439 |
| 2013/0229528 A1* | 9/2013 | Taylor .................. G01S 3/7864 |
| | | 348/169 |
| 2013/0271619 A1* | 10/2013 | Longmore ............... G02B 7/08 |
| | | 348/211.99 |
| 2014/0016920 A1* | 1/2014 | Luo ........................ G02B 7/026 |
| | | 396/144 |
| 2014/0340487 A1* | 11/2014 | Gilliland ............... G01S 7/4863 |
| | | 348/48 |

* cited by examiner

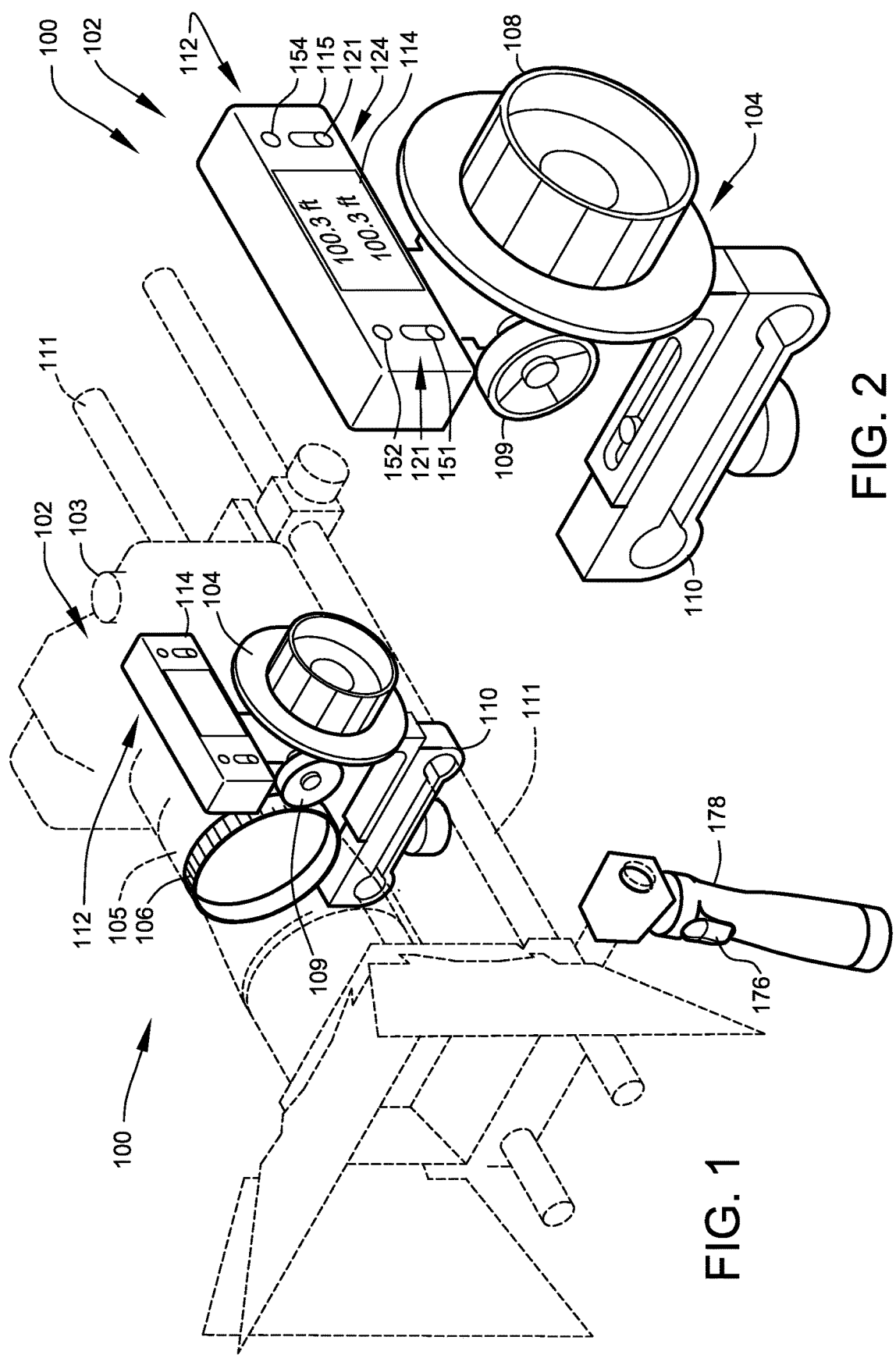

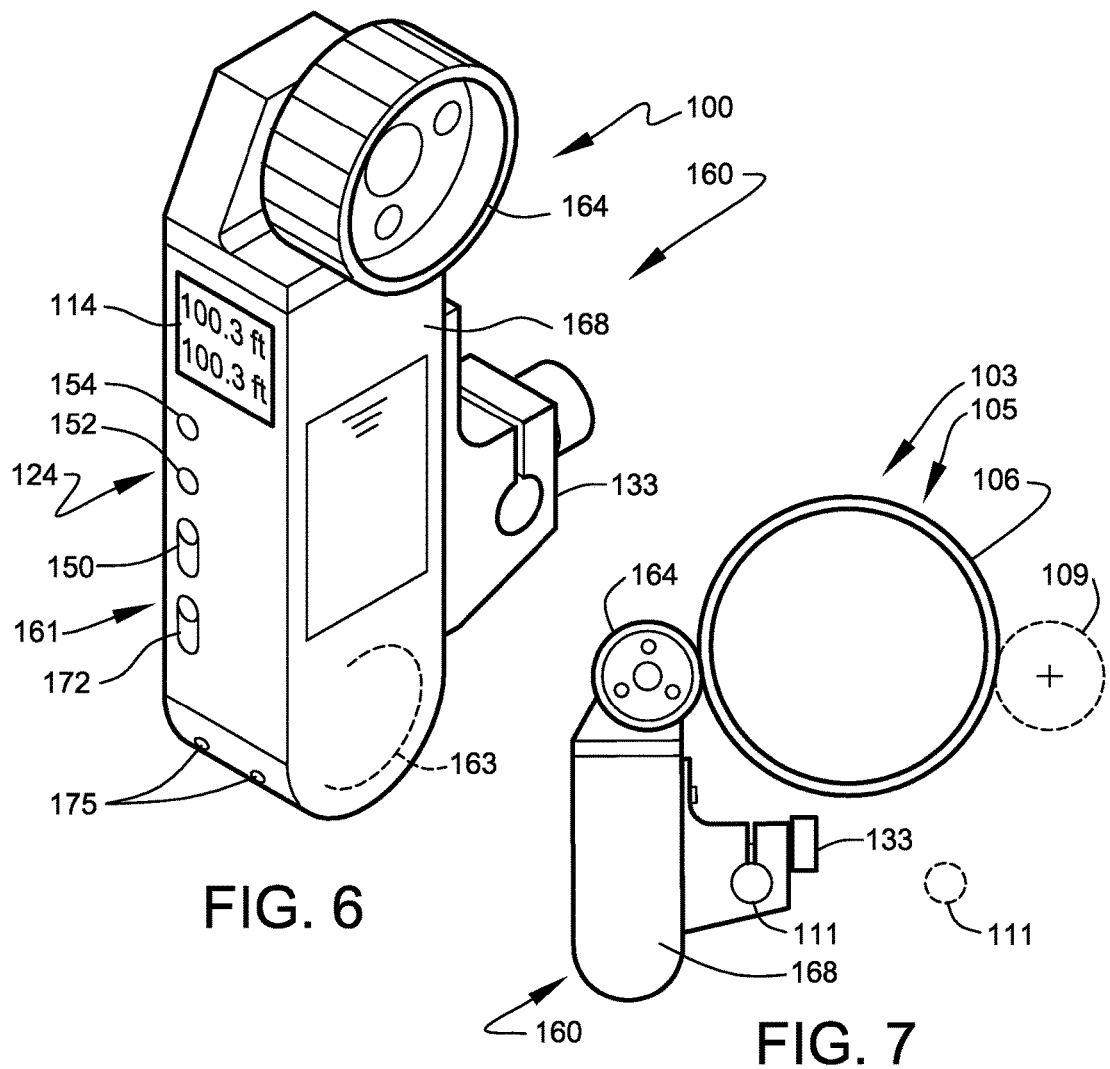
FIG. 6
FIG. 7
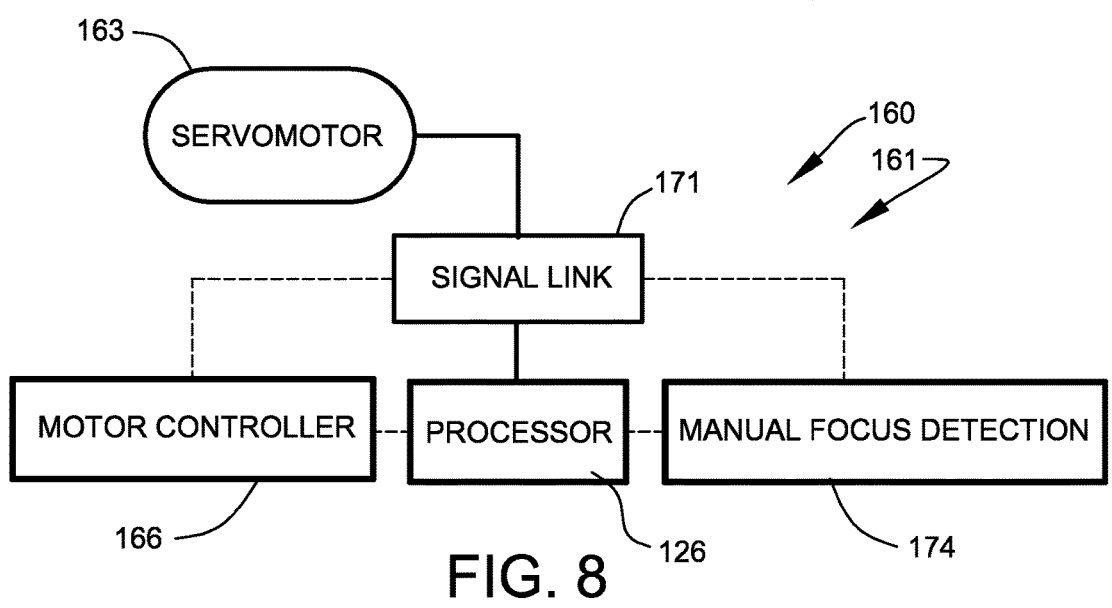
FIG. 8

LOCATION-TAG CAMERA FOCUSING SYSTEMS

CROSS-REFERENCE TO RELATED APPLICATIONS

This application claims priority in U.S. Provisional Patent Application No. 61/904,968, filed Nov. 15, 2013, and U.S. Provisional Patent Application No. 61/921,337, filed Dec. 27, 2013, the contents of which are hereby incorporated herein by reference.

BACKGROUND

The disclosed subject matter relates to providing systems relating to improved camera focusing systems using subject location tags. More particularly, the disclosed subject matter relates to providing a system comprising camera accessories and in-lens technologies that allow for the continuous, automated focus of a subject by measuring the distance between the camera and a subject that has been "tagged" with a locator beacon.

Image focus is one the most critical aspects of film and video production. Incorrect image focus can result in significant impacts to production time and production costs. Captured footage that is ruined due to improper focus settings can be particularly damaging during the course of film and video production. Out-of-focus shots or scenes are frequently discarded as unusable by the production team. Unfortunately, such discarded footage often contains subject matter of a one-time-only nature, which cannot be reshot or otherwise reproduced. For example, it is impossible to "reshoot" one-time sporting events, weddings, etc., after they have occurred.

To achieve ideal focus, the distance of a subject from a camera's focal point must be measured and accurately matched to the focal settings of the camera's lens. Often, a scene requires that the camera focus shift between several subjects within the camera's field of view. In addition, the distances between the camera and subjects can be dynamic, as with dolly or jib-mounted cameras, or in scenes where the subjects are moving. An improved system to assist in maintaining proper camera focus during all aspects of image capture would be of great benefit to many in the field.

OBJECTS AND FEATURES OF THE DISCLOSED SUBJECT MATTER

A primary object and feature of the present disclosed subject matter is to provide a system overcoming the above-mentioned problem.

It is another object and feature of the present disclosed subject matter to provide such an improved camera focusing system that uses camera accessories, and/or in-lens technologies, and allows for the continuous range finding of subjects by measuring the distance between the camera and a subject that has been "tagged" with a locator beacon.

It is an additional object and feature of the present disclosed subject matter to provide such an improved camera focusing system that displays calculated distance between the camera and a subject that has been "tagged" with a locator beacon.

It is a further object and feature of the present disclosed subject matter to provide such an improved camera focusing system that allows for the continuous, automated focus of a subject by measuring the distance between the camera and a subject that has been "tagged" with a locator beacon.

It is a further object and feature of the present disclosed subject matter to provide such an improved camera focusing system that allows for the controlled transition of focus between two or more subjects.

It is an additional object and feature of the present disclosed subject matter to provide such an improved camera focusing system that includes a manually-operable follow-focus accessory.

It is a further object and feature of the present disclosed subject matter to provide such an improved camera focusing system that includes a servo-operated follow-focus accessory.

It is another object and feature of the present disclosed subject matter to provide such an improved camera focusing system that enables a single operator to control the focus state of multiple cameras imaging multiple subjects.

A further primary object and feature of the present disclosed subject matter is to provide such a system that is efficient, inexpensive, and useful. Other objects and features of this disclosed subject matter will become apparent with reference to the following descriptions.

SUMMARY

In an embodiment, the disclosed subject matter provides a system relating to generating, for at least one image-capture device, focus-setting data associated with one or more subjects to be captured, such focus-setting data usable to control the focus state of such at least one image-capture device, such system comprising: at least one first location-data generator structured and arranged to generate first location data associated with a current location of at least one first locatable subject; at least one second location-data generator structured and arranged to generate second location data associated with a current location of such at least one image-capture device; and at least one distance calculator structured and arranged to calculate a current distance between such first locatable subject and an imager focus point of such at least one image-capture device, wherein such at least one distance calculator is configured to generate such current distance using such first location data and such second location data; wherein such at least one first location data generator comprises at least one first wireless communicator structured and arranged to wirelessly communicate such first location data; wherein such at least one distance calculator comprises at least one second wireless communicator structured and arranged to acquire the first location data by wirelessly communicating with such at least one first wireless communicator, and at least one distance-data communicator structured and arranged to communicate the calculated distance to at least one image-focus effector controlling the focus state of such at least one image-capture device; wherein such at least one first location data generator comprises at least one first motion coupler configured to physically coupler the movements of such at least one first location data generator and such at least one first locatable subject; and wherein such at least one second location data generator comprises at least one second motion coupler configured to physically couple the movements of such at least one second location data generator and such at least one image-capture device.

Moreover, it provides such a system wherein such at least one distance data communicator comprises at least one distance-data display configured to display the calculated current distance. Additionally, it provides such a system further comprising at least one distance-display supporter structured and arranged to support such at least one distance data display adjacent such at least one image-capture device.

Also, it provides such a system wherein: such at least one first location-data generator comprises at least one Radio-frequency Identification (RFID) tag structured and arranged to wirelessly transmit at least one first radio signal from which such first location data is derivable; and such at least one second location-data generator comprises at least one RFID signal receiver structured and arranged to receive such at least one first radio signal. In addition, it provides such a system wherein: such at least one first location-data generator comprises at least one first Global Positioning System (GPS) receiver structured and arranged to receive GPS signal data associated with the current location of such at least one first locatable subject, at least one first GPS signal-data processor structured and arranged to process the GPS signal data to form such first location data, and at least one first wireless transmitter structured and arranged to wirelessly transmit the first location data; such at least one second location-data generator comprises at least one second GPS receiver structured and arranged to receive GPS signal data associated with the current location of such at least one image-capture device; and such at least one distance calculator comprises at least one wireless data receiver structured and arranged to wirelessly receive the first location data.

And, it provides such a system further comprising at least one follow-focus device structured and arranged to manipulate at least one focus ring of such at least one image-capture device to assist in establishing, within such at least one image-capture device, a focus state appropriate to the imaging of the subjects to be captured. Further, it provides such a system wherein such at least one distance-display supporter is configured to support such at least one distance-data display from such at least one follow-focus device. Even further, it provides such a system wherein such at least one distance calculator comprises at least one focus-setting acquisition component structured and arranged to acquire at least one current image-focus configuration of such at least one image-capture device.

Moreover, it provides such a system wherein such at least one distance calculator further comprises at least one focus-setting display structured and arranged to display the at least one current image-focus configuration of such at least one image-capture device. Additionally, it provides such a system wherein such at least one focus-setting acquisition component is configured to acquire at least one current image-focus configuration selected from the group consisting essentially of current lens F-stop setting and current lens focal length. Also, it provides such a system wherein such at least one distance calculator further comprises: storage memory structured and arranged to store a plurality of calibration records, each one comprising data entries associated with at least one hardware configuration of such at least one image-capture device; and at least one calibration user interface structured and arranged to assist user retrieval of a selected one of the plurality of saved calibration records; wherein each one of the calibration records contains at least one data entry selected from the group consisting essentially of lens F-stop range lens focal-length range lens focus adjustment range; and wherein such calibration records are usable by such at least one image-focus effector to control the focus state of such at least one image-capture device.

In addition, it provides such a system wherein: such at least one distance calculator further comprises at least one subject-profile generator structured and arranged to generate at least one first focus-setting profile for such at least one first subject; wherein such at least one subject-profile generator generates such at least one first focus-setting profile using such first location data, such second location data, and such at least one current image-focus configuration; and wherein such generated at least one first focus-setting profile is usable by such at least one image-focus effector to control the focus state of such at least one image-capture device. And, it provides such a system further comprising: such at least one image-focus effector; wherein such at least one image-focus effector comprises at least one servomotor-operated follow-focus device structured and arranged to automatically manipulate a focus ring of such at least one image-capture device; wherein such at least one image-focus effector is configured to assist in establishing, within such at least one image-capture device, a focus state appropriate to the imaging of the subjects to be captured in response to such generated at least one first focus-setting profile.

Further, it provides such a system wherein such at least one servomotor-operated follow-focus device further comprises: at least one manually-operated focus control configured to enable manual adjustments of such focus state; at least one manual manipulation detector structured and arranged to detect manual-adjustment inputs; at least one servomotor override to override the automatic operation of such at least one servomotor-operated follow-focus device on detection of at least one manual manipulation of such at least one manually-operated focus control.

Even further, it provides such a system wherein such at least one distance calculator further comprises: at least one multi-subject data-set each data entry of such at least one multi-subject data set identifying one locatable subject of a set comprising multiple locatable subjects; at least one subject-profile generator structured and arranged to generate at least one focus-setting profile for each such data entry of such at least one multi-subject data set; and at least one locatable-subject selector structured and arranged to enable user selecting of at least one such data entry of such at least one multi-subject data set; wherein each selected such at least one focus-setting profile is usable by such at least one image-focus effector to control the focus state of such at least one image-capture device. Moreover, it provides such a system wherein such at least one distance calculator further comprises: at least one n-location data generator structured and arranged to generate n-location data associated with a current location of at least one n-locatable subject; at least one n-subject profile generator structured and arranged to generate at least one n-focus-setting profile for such at least one n-locatable subject using such n-location data; wherein each selected such at least one n-focus-setting profile is usable by such at least one image-focus effector to control the focus state of such at least one image-capture device.

Additionally, it provides such a system wherein such at least one distance calculator further comprises at least one subject-focus transitioner structured and arranged to transition such focus state of such at least one image-capture device between such at least one first focus-setting profile generated for such at least one first locatable subject and such at least one n-focus-setting profile generated for such at least one n-locatable subject. Also, it provides such a system wherein such at least one subject-focus transitioner comprises at least one user transition control structured and arrange to enable user control of a rate of change of such transition of such focus state. In addition, it provides such a system wherein such at least one distance calculator further comprises: at least one computing device, comprising at least one user interface; at least one processor; memory; and at least one program, wherein such at least one program is stored in such memory and configured to be executed by such at least one processor, such at least one program comprising instructions for displaying at least one menu on such at least one user interface, such at least one menu comprising at least one user-selectable menu item, and receiving at least one user input corresponding to at least one of such at least one user-selectable menu items. And, it provides such a system wherein such at least one program further comprises instructions for such at least one distance calculator to automatically seek locatable subjects. Further, it provides such a system wherein such at least one user interface comprises at least one touch-sensitive display.

Even further, it provides such a system wherein such at least one user interface comprises at least one current image window configured to display at least one current image captured by such at least one image-capture device. Moreover, it provides such a system wherein such at least one user interface further comprises: at least one user-selectable menu item enabling such at least one calibration user interface; and wherein such at least one user-selectable menu item enabling such at least one calibration user interface comprises at least one at least one user-selectable menu item enabling manual input of at least one hardware configuration of such at least one image-capture device. Additionally, it provides such a system wherein such at least one user interface further comprises at least one user-selectable menu item enabling user-initiated acquisition of at least one of such first location data, such second location data, and such n-location data.

Also, it provides such a system wherein such at least one user interface further comprises at least one user-selectable menu item enabling user associating of such n-location data with at least one user-selected name used to identify at least one such n-locatable subject. In addition, it provides such a system wherein such at least one user interface further comprises at least one user-selectable menu item enabling operation of such at least one subject-focus transitioner. And, it provides such a system wherein such at least one user interface further comprises at least one user-selectable menu item enabling operation of such at least one user transition control. Further, it provides such a system wherein such at least one computing device comprises at least one portable computing device.

Even further, it provides such a system further comprising at least one system controller structured and arranged to control multiple image-capture devices operating within such system. Moreover, it provides such a system wherein such at least one controller communication is wireless. Additionally, it provides such a system wherein such at least one image-capture device is a video camera.

In accordance with an embodiment hereof, the disclosed subject matter provides a system relating to generating, for at least one image-capture device, focus-setting data associated with one or more subjects to be captured, such focus-setting data usable to control the focus state of such at least one image-capture device, such system comprising: at least one locator tag structured and arranged to generate first location data associated with a current location of a tagged subject associated with such at least one locator tag; at least one image-device locator structured and arranged to generate second location data associated with a current location of such at least one image-capture device; at least one computing device structured and arranged to calculate a current distance between such locatable subject and an imager focus point of such at least one image-capture device, wherein such at least one distance calculator is configured to generate such current distance using such first location data and such second location data; at least one distance-data display configured to display the calculated current distance; and at least one follow-focus device structured and arranged to manipulate at least one focus ring of such at least one image-capture device to assist in establishing, within such at least one image-capture device, a focus state appropriate to the imaging of the subjects to be captured; wherein such at least one locator tag comprises at least one first wireless communicator structured and arranged to wirelessly communicate such first location data; wherein such at least one computing device comprises at least one second wireless communicator structured and arranged to acquire the first location data by wirelessly communicating with such at least one first wireless communicator; and wherein such at least one distance-data display comprises at least one display mount structured and arranged to assist mounting of such at least one distance-data display adjacent such at least one follow-focus device.

Also, it provides such a system wherein such at least one display mount comprises at least one computing-device mount structured and arranged to assist mounting of such at least one computing device adjacent such at least one follow-focus device. In addition, it provides such a system further comprising: at least one focus-setting acquisition component structured and arranged to acquire at least one current image-focus configuration of such at least one image-capture device; and at least one focus-setting display structured and arranged to display the at least one current image-focus configuration of such at least one image-capture device. And, it provides such a system wherein such at least one computing device comprises at least one subject-profile generator structured and arranged to generate at least one focus-setting profile for each such tagged subjects; wherein such at least one subject-profile generator generates such at least one focus-setting profile using such first location data, such second location data, and such at least one current image-focus configuration; and wherein each such generated at least one focus-setting profile is usable to control the focus state of such at least one image-capture device.

Further, it provides such a system further comprising: at least one servomotor-operated follow-focus device structured and arranged to automatically manipulate a focus ring of such at least one image-capture device; wherein at least one servomotor-operated follow-focus device is controlled by such at least one computing device; and wherein such at least one servomotor-operated follow-focus device is configured to assist in establishing, within such at least one image-capture device, a focus state appropriate to the imaging of the subjects to be captured. Even further, it provides such a system wherein such at least one computing device further comprises: at least one user interface; at least one processor; memory; and at least one program, wherein such at least one program is stored in such memory and configured to be executed by such at least one processor, such at least one program comprising instructions for displaying at least one menu on such at least one user interface, such at least one menu comprising at least one user-selectable menu item, and receiving at least one user input corresponding to at least one of such at least one user-selectable menu items.

Even further, it provides such a system wherein such at least one user interface comprises at least one touch-sensitive display. Even further, it provides such a system wherein such at least one computing device communicates with such at least one servomotor-operated follow-focus device wirelessly. In accordance with another embodiment hereof, the disclosed subject matter provides a method relating to generating, for at least one image-capture device, focus-setting data associated with one or more subjects to be captured, such focus-setting data usable to control the focus state of such at least one image-capture device, such method comprising the steps of: providing at least one locator tag structured and arranged to generate first location data associated with a current location of a tagged subject associated with such at least one locator tag; providing at least one image-device locator structured and arranged to generate second location data associated with a current location of such at least one image-capture device; providing at least one computing device structured and arranged to calculate a current distance between such locatable subject and an imager focus point of such at least one image-capture device; generating such current distance using such first location data and such second location data; providing at least one distance-data display configured to display the calculated current distance; and providing at least one follow-focus device structured and arranged to manipulate at least one focus ring of such at least one image-capture device to assist in establishing, within such at least one image-capture device, a focus state appropriate to the imaging of the subjects to be captured; manipulating such at least one focus ring of such at least one image-capture in response to the calculated current distance displayed; wherein such at least one locator tag comprises at least one first wireless communicator structured and arranged to wirelessly communicate such first location data; wherein such at least one computing device comprises at least one second wireless communicator structured and arranged to acquire the first location data by wirelessly communicating with such at least one first wireless communicator; and wherein such at least one distance-data display comprises at least one display mount structured and arranged to assist mounting of such at least one distance-data display adjacent such at least one follow-focus device.

In accordance with an embodiment hereof, the disclosed subject matter provides each and every novel feature, element, combination, step and/or method disclosed or suggested by this provisional patent application.

BRIEF DESCRIPTION OF THE DRAWINGS

FIG. 1 shows a perspective view diagrammatically illustrating a camera, modified to comprise a focus assist device, according to an embodiment of the disclosed subject matter.

FIG. 2 shows a perspective view, further illustrating the focus assist device, of FIG. 1.

FIG. 6 shows a perspective view diagrammatically illustrating a servo-operated focus assist device, according to an embodiment of the disclosed subject matter.

FIG. 7 shows a front-elevation view, illustrating a servo-operated focus assist device of FIG. 6 mounted adjacent a follow-focus gear of a focus ring of a camera, according to an embodiment of the disclosed subject matter.

FIG. 8 shows a block diagram illustrating functional elements of the servo-operated focus assist device of FIG. 6.

DETAILED DESCRIPTION

Figure 3:
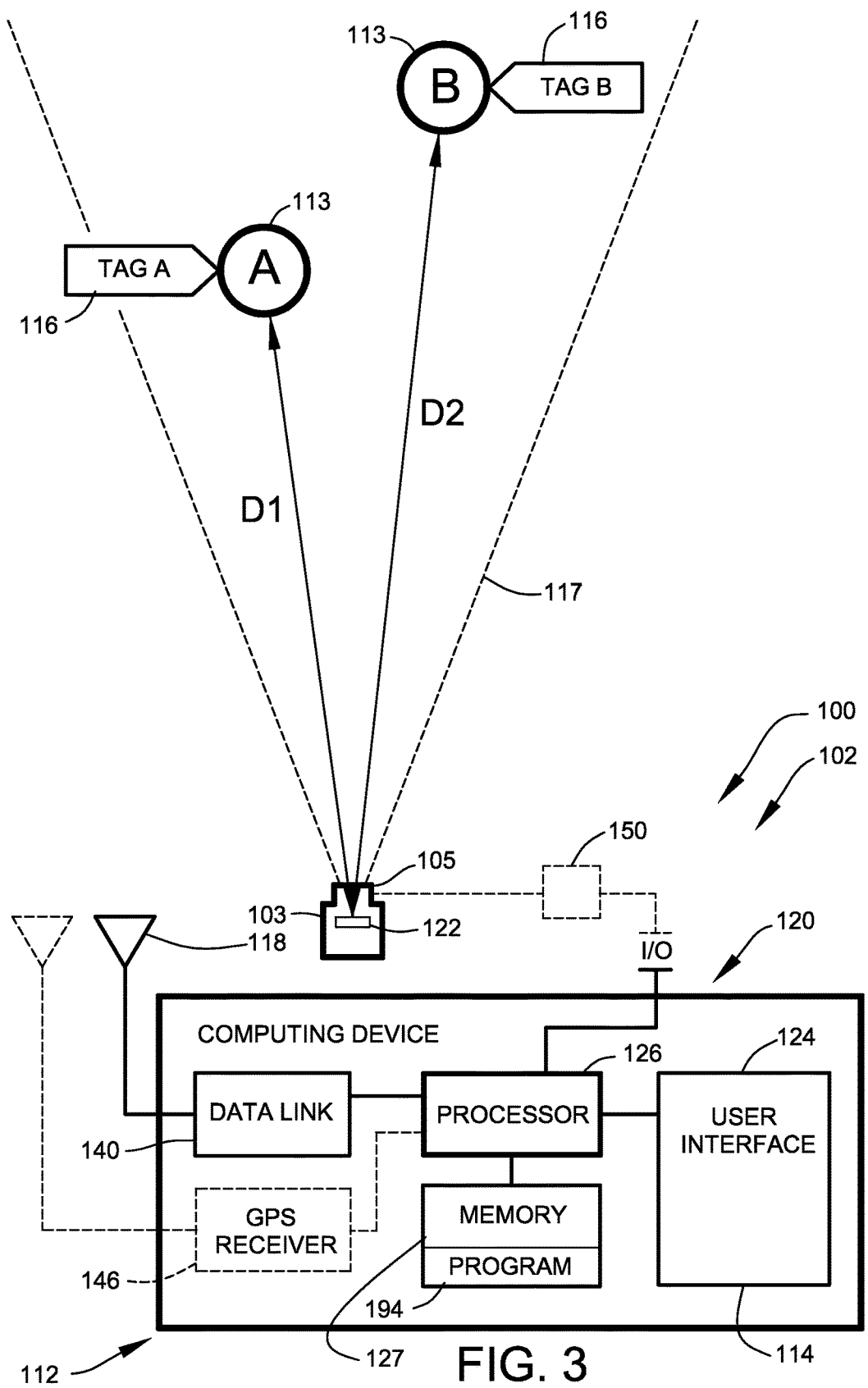
FIG. 3 shows a diagram illustrating features of the focus assist device and use of the image-capture device and interoperation with the camera of FIG. 1.

Applicant has developed a camera focusing system 100, including range-finding camera accessories designed to assist in establishing proper focus of target subjects. Generally stated, the presently-disclosed system is configured to determine the focus distance between a camera imager and a subject to be captured by establishing the current locations of the camera and the target subject.

Referring to the drawings, FIG. 1 shows a perspective view diagrammatically illustrating camera 103 (indicated by the dashed-line depiction), which has been modified to comprise applicant's focus assist device 102, according to an embodiment of the disclosed subject matter. FIG. 2 shows a perspective view, further illustrating focus assist device 102, according to the embodiment of FIG. 1. A primary capability of focus assist device 102 is the ability of the system to accurately calculate focus distances to target subjects. To achieve perfect focus, the distance of a subject from the focal point of camera 103 must be measured and accurately matched to the focal ring of camera lens 105. Focus assist device 102 assists the operator of camera lens 105 to correctly adjust the focus state of camera 103 by displaying such calculated distances at or near the focal ring of camera lens 105. This range-finding feature allows the lens operator to consistently pull focus to the correct distance.

In an embodiment, the camera focus assist device 102 is equipped with at least one distance computation unit 112 having distance display 114, as shown. Distance computation unit 112 is configured to calculate focus distances between camera 103 and one or more locatable subjects 113 (see FIG. 3). Distance computation unit 112 is configured to receive and process distance data associated with a locatable subject 113. Results of such distance calculations appear on distance display 114 and may be used by the operator of camera lens 105 to properly adjust the focus state of camera 103 (at least embodying herein at least one distance-data communicator structured and arranged to communicate the calculated distance to at least one image-focus effector controlling the focus state of such at least one image-capture device). System implementations supporting the above-described features are further described by and/or in reference to FIG. 3.

In an embodiment, the focus assist device 102 further comprises at least one follow-focus unit 104, as shown in FIGS. 1 and 2. Follow-focus unit 104 is configured to assist the camera operator to manually adjust the focal ring of camera lens 105. Follow-focus unit 104 comprises a gear set that operably links the outer focus wheel 108 and inner drive gear 109. Drive gear 109 is configured to engage a ring gear 106, which is mounted to, or forms an integral part of, a focus ring of camera lens 105, as shown.

Manipulation of focus wheel 108 results in a smooth vibration-free rotation of ring gear 106. Thus, follow-focus unit 104 enables the operator to establish, within camera 103, a focus state appropriate to the imaging of the subjects to be captured. Commercial follow-focus units, having components adaptable to function as follow-focus unit 104, include models selected from the Z-Focus® line produced by the ZacutoUSA Corporation of Chicago Ill.

Focus assist device 102 comprises at least one mount 110 configured to mount the focus assist device 102 in a position adjacent to camera 103, as shown.

In an embodiment, mount 110 is an integral component of follow-focus unit 104, as shown in FIGS. 1 and 2. Mount 110 is compatible with at least one of three commonly used camera rail systems 111, such as, for example, the 15 millimeter (mm) matte box support rods indicated by the dashed-line depiction of FIG. 1. Upon reading this specification, those with ordinary skill in the art will now appreciate that, under appropriate circumstances, considering such issues as design preference, user preferences, marketing preferences, cost, structural requirements, available materials, technological advances, etc., other mounting arrangements such as, for example, mounts configured to couple to a camera body, mounts configured to couple to a tripod, etc., may suffice.

In the embodiment of FIG. 1 and FIG. 2, distance computation unit 112 is contained within housing 115 and is supported by the follow-focus unit 104, as shown. Housing 115 of distance computation unit 112 comprises distance display 114 along with user input controls 121 and indicator lights forming user interface 124. In addition, arrangements of housing 115 further include provisions for battery compartments, external data ports, external power ports, etc.

FIG. 3 shows a diagram illustrating an embodiment of features and arrangements of the focus assist device 102, according to FIG. 1. Camera focusing system 100 operates by associating a locator tag 116 with each subject to be captured by camera 103. Locator tags 116 (also referred to herein as "locator beacon" or simply "beacon") are configured to transmit at least one wireless signal detectable by computation unit 112 (at least embodying herein wherein such at least one first location data generator comprises at least one first wireless communicator structured and arranged to wirelessly communicate such first location data). The wireless signal contains location-data usable relating to computation unit 112 to determine the current location of the tagged subjects. Thus, any target subject becomes locatable by the system if the subject possesses a locator tag 116 and is within the detection range relating to computation unit 112.

As an example of the system, two locatable subjects 113, identified in FIG. 3 as subject "A" and subject "B", are located within the field of view 117 of camera 103 (at least embodying herein at least one image-capture device). Each locatable subject 113 carries a locator tag 116 capable of transmitting current subject-location data to a wireless-signal receiver 118 of focus assist device 102 (at least embodying herein at least one second wireless communicator structured and arranged to acquire the first location data by wirelessly communicating with such at least one first wireless communicator). Each locator tag 116 (at least embodying herein at least one first location-data generator structured and arranged to generate first location data associated with a current location of at least one first locatable subject) comprises a distinct identifier allowing focus assist device 102 to differentiate signals originating from multiple locator tags 116 and associated locatable subjects 113. Locator tags 116 are designed to move with locatable subject 113, for example, by surface mounting to a person or an object, clipping to an article of clothing worn by an actor, or by adhering to a portion of a vehicle (at least embodying herein wherein such at least one first location data generator comprises at least one first motion coupler configured to physically couple the movements of such at least one first location data generator and such at least one first locatable subject). Thus, locator tag 116 identified as "Tag A" moves with subject "A" and locator tag 116 identified as "Tag B" moves with subject "B".

In an embodiment, the camera focusing system 100 includes at least two cameras 103 and a distance computation unit 112, and at least one locator tag 116 allowing multiple cameras 103 to be used with multiple locator tags 116 allowing the system 100 to automatically focus the cameras 103 on subjects 113 with tags 116. In an embodiment, the locator tags 116 communicate with one another and the cameras 103 to determine distances in real time. In an embodiment, the camera focusing system 100 uses one or more stationary references points or anchors to increase the accuracy of the distance calculation between the subjects 113 with tags 116 and the camera 103. In an embodiment, the stationary reference points generate a radio transmission that communicates with the tags 116 and the distance computation unit 112 to determine distances between the elements in real time. In an embodiment, the locator tags 116 communicate with one another, the stationary reference points, and the camera 103 to determine distances between the elements in real time.

Distance computation unit 112 comprises at least one camera locator 120 designed to generate location data associated with a current location of camera 103 (at least embodying herein second location data associated with a current location of such at least one image-capture device). The method of generating such secondary location data for camera 103 is dependent on the method used to generate the first subject location data associated with the target subjects, and this method will be discussed further in a later section of the present disclosure.

Distance computation unit 112 utilizes current subject-location data received from locator tags 116 and the secondary location data for camera 103 to calculate the distances between imager focus point 122 and the target subjects located within field of view 117 (at least embodying herein wherein such at least one distance calculator is structured and arranged to calculate a current distance between such first locatable subject and an imager focus point of such at least one image-capture device and wherein such at least one distance calculator is configured to generate such current distance using such first location data and such second location data). For example, distance computation unit 112 utilizes current subject-location data received from "Tag A" and secondary location data from camera locator 120 to calculate distance D1 between subject "A" and imager focus point 122 of camera 103. Thus, distance computation unit 112 generates at least one focus-setting profile for subject "A" that is usable by the operator of camera 103 (at least embodying herein at least one image-focus effector) to control the focus state of camera 103 (at least embodying herein wherein such at least one subject-profile generator generates such at least one first focus-setting profile using such first location data, such second location data, and such at least one current image-focus configuration; and wherein such generated at least one first focus-setting profile is usable by such at least one image-focus effector to control the focus state of such at least one image-capture device). Similarly, distance computation unit 112 utilizes current subject-location data received from "Tag B" and secondary location data from camera locator 120 to calculate distance D2 between subject "B" and imager focus point 122 of camera 103. Thus, distance computation unit 112 generates at least one focus-setting profile for subject "B" that is usable by the operator of camera 103.

Referring to the block diagram of FIG. 3, distance computation unit 112 comprises at least one user interface 124, at least one processor 126, and system memory 127, as shown. A data link 140, comprising wireless-signal receiver 118, functions to receive first location data from locator tags 116 and pass the data to processor 126.

Distance computation unit 112 implements the above-described range-finding functions using wireless communication technologies. In an embodiment, Radio-frequency Identification (RFID) technology is used, as generally described relating to FIG. 4.

Figure 4:
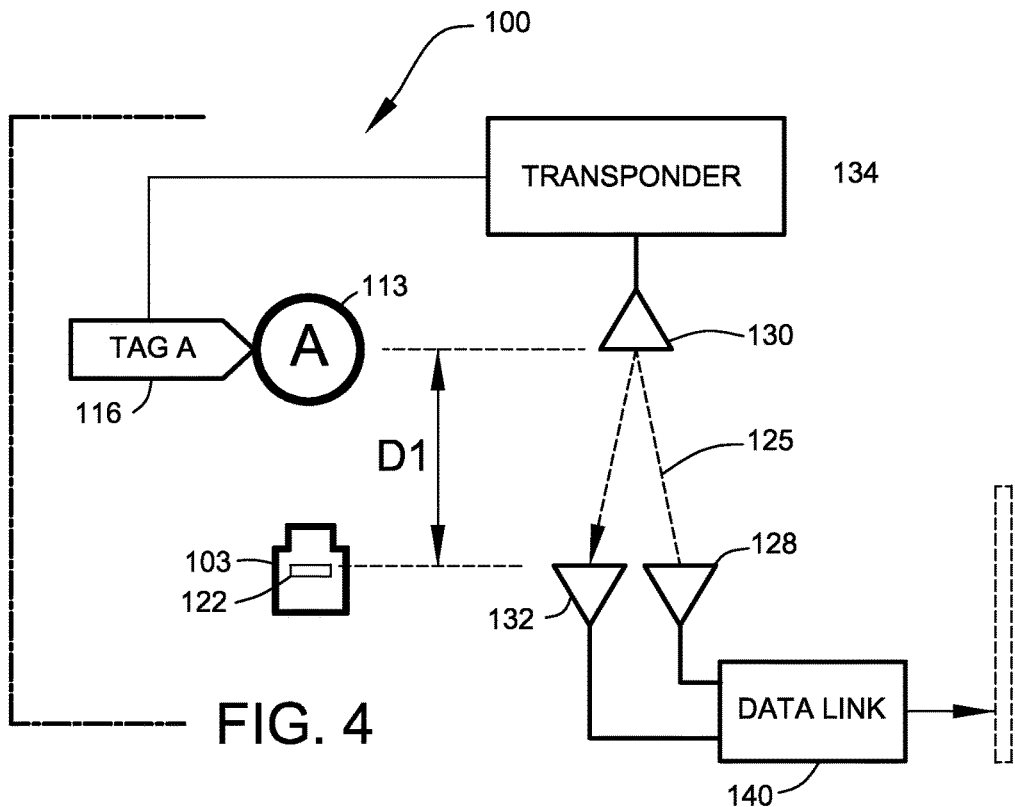
FIG. 4 shows a schematic diagram illustrating an embodiment of applicant's locator tag.

FIG. 4 shows a schematic diagram illustrating an RFID-enabled locator tag 116, according to an embodiment of the disclosed subject matter. The RFID-enabled distance computation unit 112 utilizes a calculation of distance D1 based on the time-of-flight of a radio signal. More specifically, the RFID-enabled distance computation unit 112 measures the time it takes for a radio signal 125 to travel from transmitter antenna 128 to the tag antenna 130 and back to reader antenna 132. The distance from camera 103 to the tag is calculated based on the travel speed of a radio wave at the speed of light. The RFID-enabled locator tag 116 may comprise an active (or passive) transponder 134 to relay the signal. In an embodiment, transmitter antenna 128 and reader antenna 132 comprise an extension of data link 140 and, depending on engineering preference, may comprise a single send-receive antenna (at least embodying herein wherein such at least one first location-data generator comprises at least one RFID tag structured and arranged to wirelessly transmit at least one first radio signal from which such first location data is derivable; and such at least one second location-data generator comprises at least one RFID signal receiver structured and arranged to receive such at least one first radio signal).

Implementation of a camera locator 120 within the RFID-enabled distance computation unit 112 is accomplished through a simple fixed physical association of reader antenna 132 and imager focus point 122 (wherein such at least one second location data generator comprises at least one second motion coupler configured to physically couple the movements of such at least one second location data generator and such at least one image-capture device). Upon reading this specification, those with ordinary skill in the art will now appreciate that, under appropriate circumstances, considering such issues as design preference, user preferences, marketing preferences, cost, available materials, technological advances, etc., other RFID technologies such as, for example, measurement of signal strength, angle of arrival of the radio wave from the tag measured at several reader locations to draw locating vectors back toward the tag, calculating the distance through triangulation of multiple beacons, etc., may suffice. In addition, other wireless communication technologies may be deployed using time-of-flight of a radio signal, such as Bluetooth®-enabled locator tags 116, ultra-wideband technology enabled locator tags 116, ultra-wideband-enabled locator tags 116, such as impulse radio transmission, Wi-Fi triangulation or GSM cellular triangulation of locator tags 116 and associated system 100 components, and corresponding hardware and software with the distance computation unit 112.

Figure 5:
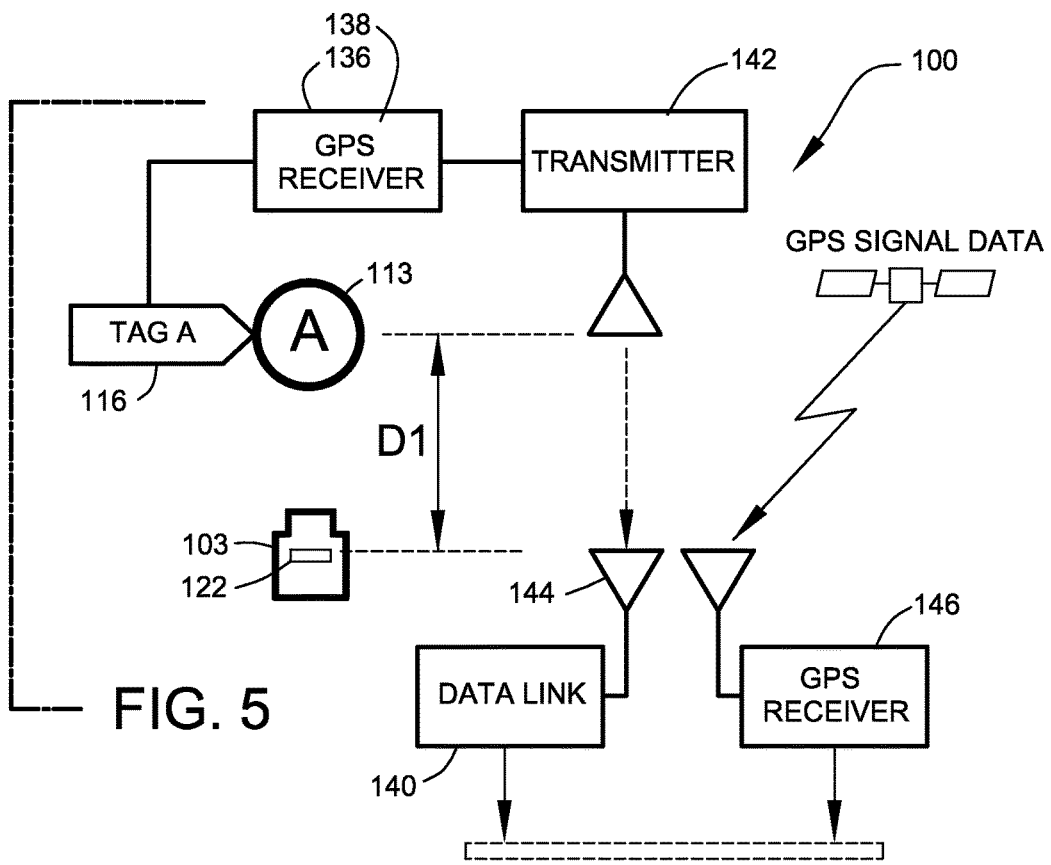
FIG. 5 shows a schematic diagram illustrating an embodiment of applicant's locator tag.

In an embodiment, distance computation unit 112 implements the above-described range-finding functions using a set of Global Positioning System (GPS) receivers, as generally described in FIG. 5.

FIG. 5 shows a schematic diagram illustrating a GPS-enabled locator tag 116. The GPS-enabled locator tag 116 ("Tag A") comprises at least one GPS receiver 136 structured and arranged to receive GPS signal data associated with the current location of locatable subject 113 (subject "A").

GPS receiver 136 comprises at least one first GPS signal-data processor 138 structured and arranged to process the GPS signal data to generate current location data for locatable subject 113 (subject "A"). GPS-enabled locator tag 116 contains a wireless transmitter 142 to transmit the subject location data to a wireless receiver 144 of data link 140 located within the GPS-enabled distance computation unit 112, as shown (at least embodying herein wherein such at least one distance calculator comprises at least one wireless data receiver structured and arranged to wirelessly receive the first location data). Upon reading this specification, those with ordinary skill in the art will now appreciate that, under appropriate circumstances, considering such issues as design preference, user preferences, marketing preferences, cost, technological advances, etc., other tagging technologies, such as, for example, utilizing a GPS-enable mobile phone as a beacon, implementing communication using IR-based data signals, etc., may suffice.

Implementation of camera locator 120 within the GPS-enabled distance computation unit 112 is accomplished by integration of a second GPS receiver 146 within the GPS-enabled distance computation unit 112. Second GPS receiver 146 receives GPS signal data associated with the current location of camera 103 and passes the location data to processor 126 (see also FIG. 3). Distance D1 is calculated by comparing the GPS location data.

Referring again to FIG. 3, an embodiment of the camera focusing system 100 further includes at least one focus-setting acquisition component 150. Focus-setting acquisition component 150 is configured to acquire current distance setting of the focal ring of camera lens 105. Image-focus settings acquired by focus-setting acquisition component 150 include current lens F-stop setting and current lens focal length of camera lens 105. The F-stop setting and lens focal lengths are utilized to calculate depth of field and focal range of camera lens 105.

Current distance settings of the focal ring of camera lens 105 are displayed at user interface 124 (see FIG. 2), thus allowing the operator of camera 103 to confirm the accuracy of the image focus. Referring again to FIG. 2, current distance settings of the focal ring of camera lens 105 are displayed on distance display 114 of focus assist device 102 (at least embodying herein at least one focus-setting display structured and arranged to display the at least one current image-focus configuration of such at least one image-capture device).

In an embodiment, locator tags 116 include an on/off switch, battery housing, and power input for recharging. In addition, the system embodiments have the ability to control refresh rate options for locator tags 116.

Referring again to the illustration of FIG. 2, user interface 124 of distance computation unit 112 includes an On/Off switch 151, Synch Button 152, distance display 114, and confirmation light 154, as shown. Synch Button 152 when activated, initiates a search for all locator tags 116 within broadcast range. A green illumination confirmation light 154 indicates that a locator tag 116 is being tracked.

Distance display 114 shows the calculated distance from camera to locator tag 116 and, if equipped with the focus-setting acquisition component 150 of FIG. 3, the current distance setting of the focal ring of camera lens 105. It is noted that embodiments of camera focusing system 100 are further configured to record the range of focus adjustment of camera lens 105. An example technology adaptable for use as focus-setting acquisition component 150 is a Cinematography Electronics/i Lens Display Unit produced by Cooke Optics Limited of Thurmaston Leicester, United Kingdom.

FIG. 6 shows a perspective view diagrammatically illustrating a servo-operated focus assist device 160, according to an embodiment of the present disclosed subject matter. Focus assist device 160 comprises distance computation unit 161 interoperating with electrically-operated servomotor 163, as shown. FIG. 7 shows a front-elevation view, illustrating servo-operated focus assist device 160 mounted adjacent follow-focus ring gear 106 of a focus ring of a camera 103. FIG. 8 shows a block diagram illustrating functional elements of the servo-operated focus assist device 160 of FIG. 6.

Referring to the illustrations of FIG. 6 through FIG. 8, servomotor 163 is configured to operate a gear drive 164, which engages the ring gear 106/focus ring of camera lens 105, as depicted in FIG. 7 (and conceptually illustrated in FIG. 1). Servo-operated focus assist device 160 (at least embodying herein at least one image-focus effector) is configured to automatically adjust the focus state of camera 103, as appropriate to the proper imaging of locatable subjects 113. More specifically, servo-operated focus assist device 160 is configured to automatically adjust the focus state of camera 103 in response to subject location profiles generated by distance computation unit 161 using location data received from locator tags 116 (at least embodying herein wherein such at least one image-focus effector is configured to assist in establishing, within such at least one image-capture device, a focus state appropriate to the imaging of the subjects to be captured in response to such generated at least one first focus-setting profile).

Distance computation unit 161 includes the previously-described features and functions of distance computation unit 112 (see FIG. 3) and the additional motor control and sensor elements shown in FIG. 8. Servomotor 163 of the present embodiment comprises a stepper motor controlled by processor 126 communicating through at least one digital motor controller 166, as shown. In the present disclosure, motor controller 166 may comprise indexers, drivers, etc., as required to operate servomotor 163. Distance data is converted by distance computation unit 161 into control signals used to operate servomotor 163. In an embodiment of the present system, control signals from processor 126 are communicated through motor controller 166 and passed to servomotor 163 via signal link 171 (at least embodying herein at least one distance-data communicator structured and arranged to communicate the calculated distance to at least one image-focus effector controlling the focus state of such at least one image-capture device).

A manual focus detector 174 functions such that any manual manipulation of the lens focus ring or (if equipped) drive gear 109 of the follow focus is detected by the system and results in a temporary termination of the system's automatic focus functions. In an embodiment, manual focus detector 174 includes at least one strain gauge sensor. The strain gauge sensor has an output signal which is proportional to the varying amount of pressure. Servo-operated focus assist device 160 includes control logic to override the operation of servomotor 163 when output signal of the strain gauge sensor exceeds a preset level (at least embodying herein at least one manually-operated focus control configured to enable manual adjustments of such focus state; at least one manual manipulation detector structured and arranged to detect manual-adjustment inputs; and at least one servomotor override to override the automatic operation of such at least one servomotor-operated follow-focus device on detection of at least one manual manipulation of such at least one manually-operated focus control).

Both distance computation unit 161 and servomotor 163 are located within housing 168. Housing 168 comprises at least one mount 133 configured to mount housing 168 in a position adjacent camera 103, as shown in FIG. 7. In an embodiment of FIG. 6, mount 133 is compatible with at least one of three commonly used camera rail systems 111, such as, for example, the 15 millimeter (mm) matte box support rods indicated by the dashed-line depiction of FIG. 1.

The outside of housing 168 is configured to support user interface 124, as shown. User interface 124 of servo-operated focus assist device 160 comprises an On/Off switch 150, a Synch Button 152, a distance display 114, and a tracking confirmation light 154, as shown. Synch Button 152, when activated, initiates a search for all locator tags 116 within broadcast range. A green illumination of tracking confirmation light 154 indicates that at least one locator tag 116 is being tracked.

Referring to FIG. 6, distance display 114 shows: the calculated distance from camera to locator tag 116; and, if equipped with focus-setting acquisition component 150, the current distance setting of the focal ring of camera lens 105. In addition, user interface 124 of servo-operated focus assist device 160 includes a manual override switch 172 to permit the operator to revert to manual focus by overriding the automatic functions of the system.

Both distance computation unit 161 and servomotor 163 are powered by onboard batteries (not shown). In addition, servo-operated focus assist device 160 includes external power and wired control input ports 175, as shown.

Alternately, servomotor 163 may be incorporated within camera lens 105 with distance computation unit 161 located within the camera lens 105, alternately within the body of camera 103 or alternately located in a portable computing device, as further described below. The in-lens embodiment is configured to focus the lens by manipulation of the camera lens 105 or manipulation of the focus ring of the camera lens 105, wherein the camera lens 105 or focus ring of the camera lens 105 is driven by servomotor 163. The in-lens servomotor 163 is configured to be selectively set to either automatic actuation or manual operation.

Servo-operated focus assist device 160 enables remotely-controlled focusing of camera 103. Thus, an important advantage of the present embodiment is that the operator of camera lens 105 is no longer required to be located near camera 103 to pull focus. Moreover, various arrangements of servo-operated focus assist device 160 enable the use of one or more remotely-located input devices. For example, an embodiment of the present system includes remote finger triggers 176 that are incorporated within handles 178 of the shoulder-supported camera rail system 111 illustrated in FIG. 1. Finger triggers 176 are operably coupled to distance computation unit 161 to allow a single operator of camera 103 to remotely signal servo-operated focus assist device 160 to switch focus between two locatable subjects 113. In this embodiment, the operator initiates a transition between two focus-setting profiles generated by distance computation unit 161. Manipulation of finger triggers 176 may initiate the processor-controlled transition between a focus-setting profile for subject "A" and a focus-setting profile for subject "B". It is again noted that focus-setting profiles are generated by distance computation unit 161 for locatable subjects 113 using current subject-location data and current camera location data. Upon reading this specification, those with ordinary skill in the art will now appreciate that, under appropriate circumstances, considering such issues as design preference, user preferences, marketing preferences, cost, technological advances, etc., other control arrangements such as, for example, subject tracking including automatic control of camera pan/tilt, etc., may suffice.

Figure 9:
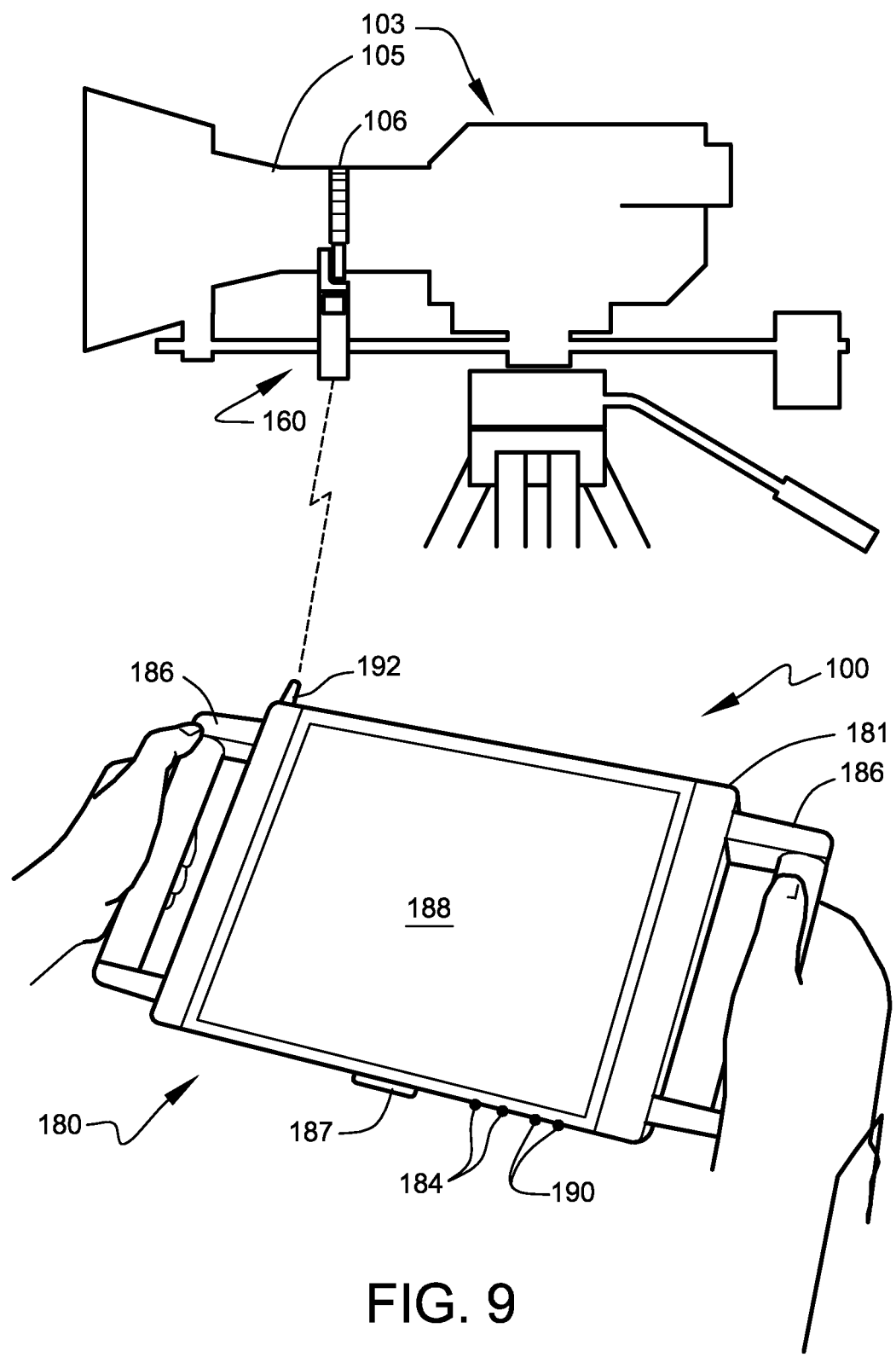
FIG. 9 shows a perspective view diagrammatically illustrating a camera, modified to comprise the servo-operated focus assist device of FIG. 6, which is remotely controlled by a portable user interface, according to an embodiment of the disclosed subject matter.

An embodiment of the present system implements at least one remote video monitoring and control device, wherein user interface 124 comprises a touch-screen display located within a hand-held portable device, as further described in FIG. 9. Such portable devices allow members of the camera-assistant team to control the camera lens 105 from a remote location. This allows the focus puller to stand away from camera 103 if needed.

FIG. 9 shows a perspective view diagrammatically illustrating camera 103, modified to comprise servo-operated focus assist device 160 that is remotely controlled by portable user interface 180, according to an embodiment of the disclosed subject matter. Portable user interface 180 comprises a hand-held device containing user interface 124, as shown. In an embodiment of the present system, user interface 124 comprises touch-sensitive display screen 188 that the user can control through simple or multi-touch gestures. Portable user interface 180 comprises a durable outer housing 181 supporting touch-sensitive display screen 188, as shown. In addition, outer housing 181 contains power input port 184, battery storage (not shown), peripheral hand grips 186, and communication ports 190 to enable hard-wired connections to servo-operated focus assist device 160. An embodiment of the portable user interface 180 comprises at least one wireless communicator 192 configured to enable wireless communication between portable user interface 180 and servo-operated focus assist device 160, as shown.

Outer housing 181 comprises at least one mount 187 to permit portable user interface 180 to be attached to traditional camera riggings. A version of mount 187 enables portable user interface 180 to be attached to camera rail systems 111.

Referring again to the block diagram of FIG. 3, distance computation unit 161 comprises at least one executable program 194, as shown. Program 194 is stored in system memory 127 and is configured to be executed by processor 126. Program 194 comprises instructions for displaying a series of menus 196 on touch-sensitive display screen 188, as shown in FIG. 10.

Figure 10:
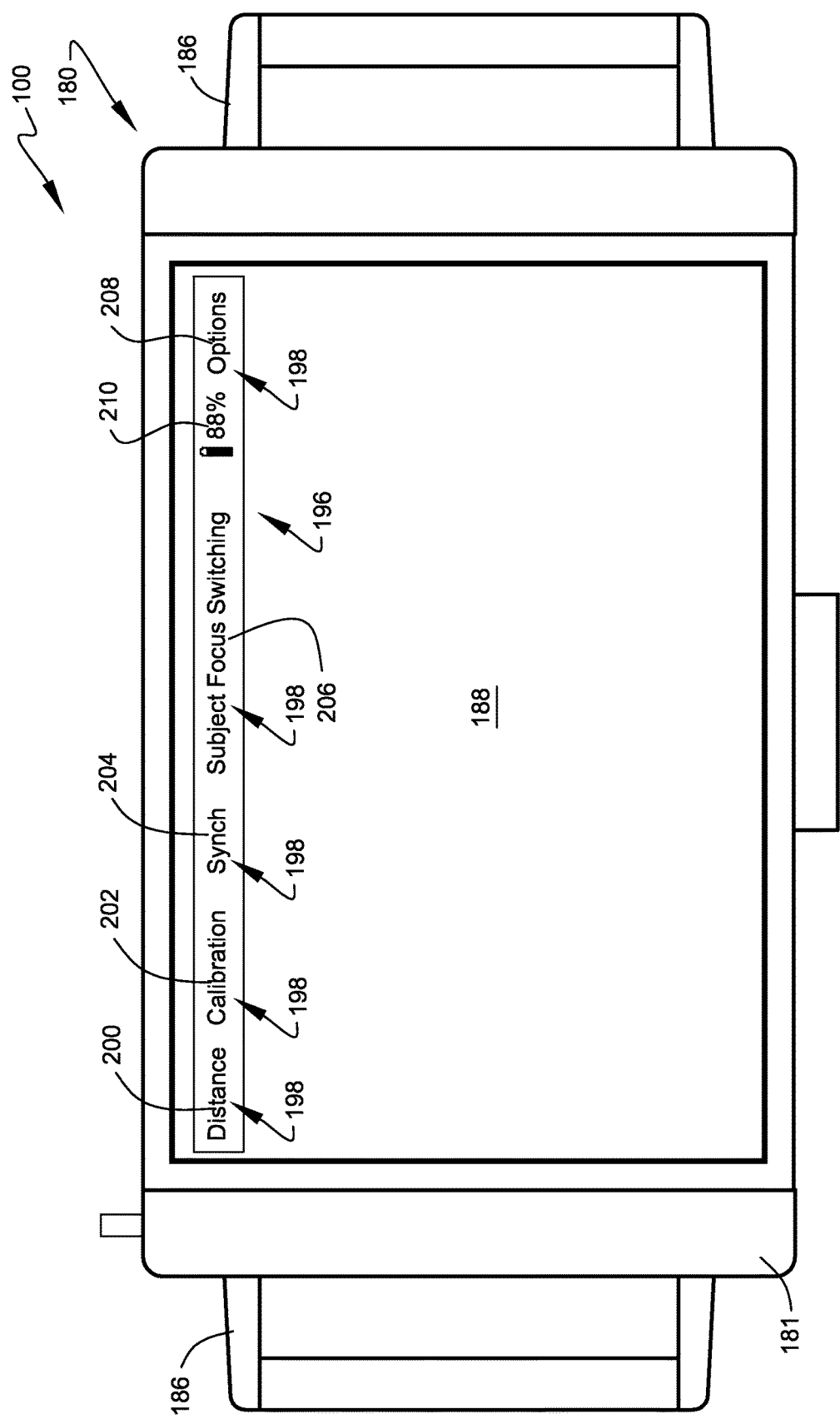
FIG. 10 shows a front view, illustrating a portable user interface, according to an embodiment of the disclosed subject matter.

FIG. 10 shows a front view, illustrating portable user interface 180, according to another embodiment of the present disclosed subject matter. Touch-sensitive display screen 188 is used to generate a set of system menus 196. Each menu 196 comprises at least one menu item 198, as shown. Menu items 198 are either of an informational nature or function to receive at least one user input corresponding to an action to be performed by the system apparatus. Menu items 198 allow the user to input or select lens information, customize the name of subjects, switch focusing from subject to subject, select speed of focusing, save lens settings, and automatically calibrate the lenses, as described below.

On startup of portable user interface 180, program 194 is configured to display primary menu 196 on touch-sensitive display screen 188. A primary menu 196 includes the following selectable menu items 198: "Distance" menu item 200, "Calibration" menu item 202, "Synch" menu item 204, "Subject focus switching" menu item 206, and "Options" menu item 208. Each selectable menu item 198 of the primary menu 196 provides a user-selectable link to a submenu operated by program 194, as generally described in FIG. 11 through FIG. In addition, program 194 displays a battery status indicator 210, as shown.

Figure 11:
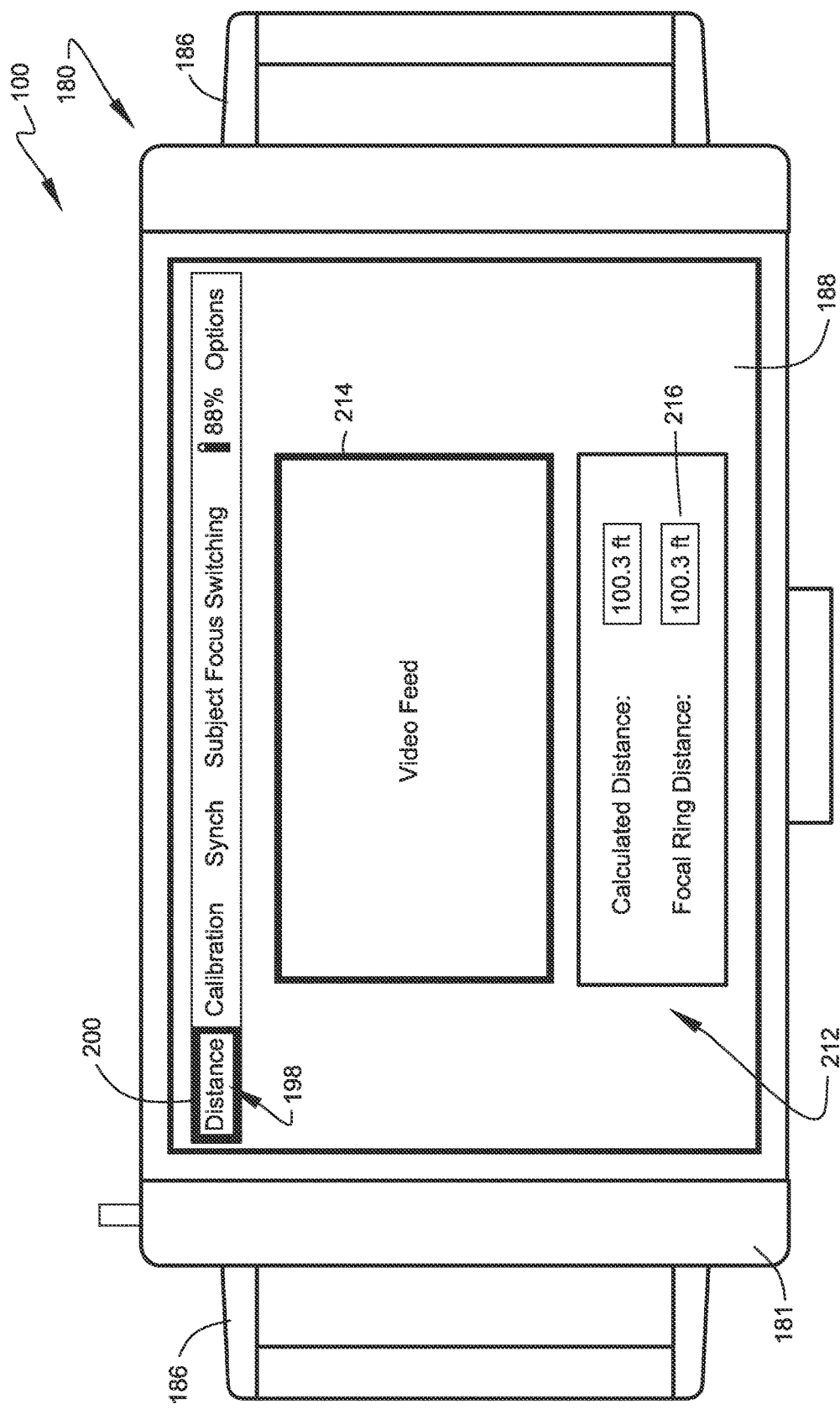
FIG. 11 shows a front view, illustrating the portable user interface of FIG. 9, displaying a focus-distance display menu, according to an embodiment of the disclosed subject matter.

User selection of "Distance" menu item 200 within the primary menu 196 results in the display of focus-distance display menu 212 on touch display screen 188, shown in FIG. 11. FIG. 11 shows a front view, illustrating the portable user interface of FIG. 9, displaying a focus-distance display menu 212.

Focus-distance display menu 212 includes a video window 214 displaying a live video feed from camera 103 (at least embodying herein at least one current image window configured to display at least one current image captured by such at least one image-capture device) and distance display 114 showing the calculated distance from camera 103 to locator tag 116. In addition, focus-distance display menu 212 comprises lens setting display 216 showing current distance settings of the focal ring of camera lens 105. It is noted that program 194 interoperates with focus-setting acquisition component 150 to generate the content of lens setting display 216.

Figure 12:
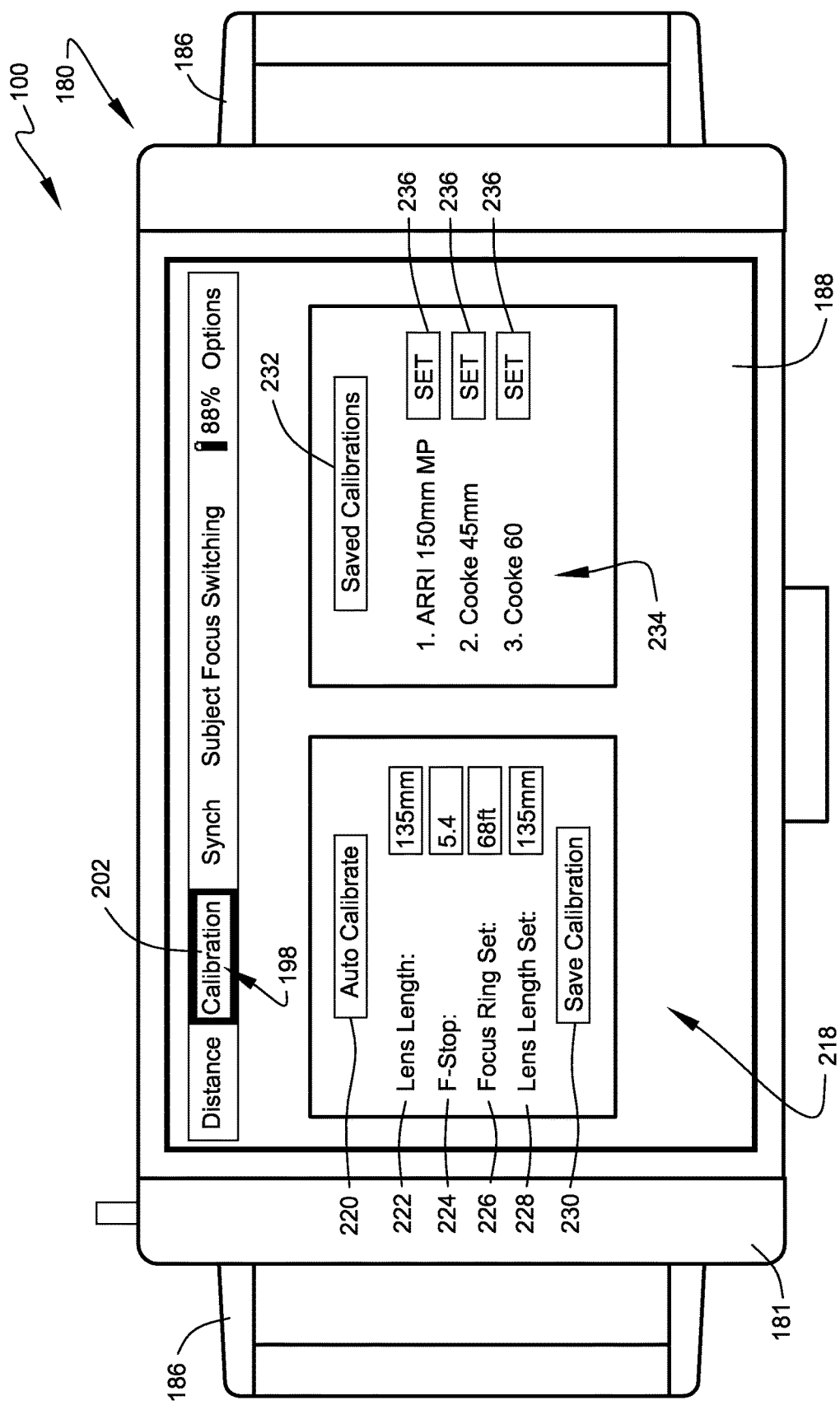
FIG. 12 shows a front view, illustrating the portable user interface of FIG. 9, displaying a calibration menu, according to an embodiment of the disclosed subject matter.

User selection of "Calibration" menu item 202 within the primary menu 196 results in the display of calibration menu 218 on touch display screen 188, shown in FIG. 12. FIG. 12 shows a front view, illustrating the portable user interface of FIG. 9, displaying a calibration menu 218, according to an embodiment of the disclosed subject matter. Calibration menu 218 includes "Automatic lens calibration" menu item 220, "Lens length" menu item 222, "F-Stop" menu item 224, "Focus ring distances point setting" menu item 226, "Zoom lens length" calibration menu item 228, and "Save Calibration" menu item 230, as shown.

"Lens length input" menu item 222 is used to calculate depth of field/focal range of camera lens 105. "F-Stop" menu item 224 is used to calculate depth of field/focal range of camera lens 105.

In addition, calibration menu 218 includes "Saved calibrations" menu item 232, Saved Calibrations List 234, and "Select Calibration" menu items 236.

"Saved calibrations" menu item 232 is used to set F-stop, focus ring settings, and lens length settings in system memory 127. This allows the configuration for already calibrated lenses to be easily set in the future, thus reducing the need to re-calibrate as camera lenses 105 are interchanged. Saved calibrations list 234 shows a list of saved calibrations. Saved calibrations are editable by the user (at least embodying herein at least one at least one user-selectable menu item enabling manual input of at least one hardware configuration of such at least one image-capture device).

Figure 13:
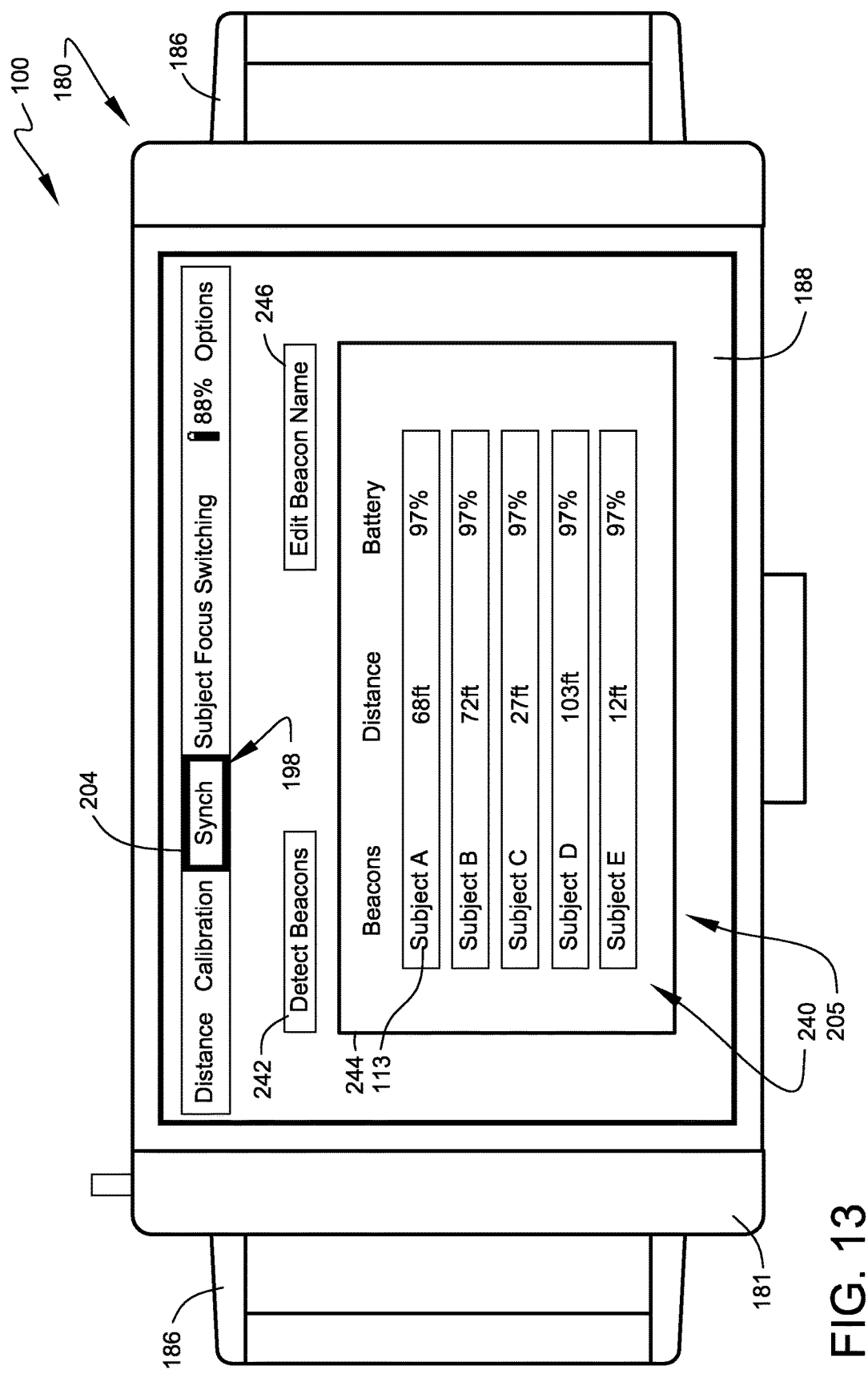
FIG. 13 shows a front view, illustrating the portable user interface of FIG. 9, displaying a tag synchronization menu, according to an embodiment of the disclosed subject matter.

Program 194 further comprises instructions for distance computation unit 161 to automatically seek locatable subjects 113 (at least embodying herein wherein such at least one program further comprises instructions for such at least one distance calculator to automatically seek locatable subjects). User selection of "Synch" menu item 204 within the primary menu 196 results in the display of tag synchronization menu 240 on touch display screen 188, as shown in FIG. 13. FIG. 13 shows a front view, illustrating portable user interface 180 displaying tag synchronization menu 240, according to another embodiment of the disclosed subject matter.

Tag synchronization menu 240 allows the user to initiate the automatic seeking of locatable subjects 113 within the detection range of the device. "Detect beacons" menu item 242, when selected, results in the system searching for all readable locator tags 116 and lists all detected locator tags 116 as "Subjects."

Program 194 is configured to generate a multi-subject data-set 205 with each data entry of multi-subject data set 205 identifying a single locatable subject 113 of the multiple locatable subjects 113 within the detection range of the system. Subject location profiles are actively generated by program 194 using location data received from locator tags 116 (at least embodying herein at least one subject-profile generator structured and arranged to generate at least one focus-setting profile for each such data entry of such at least one multi-subject data set). Multi-subject data-set 205 and their associated subject-location profiles are stored in system memory 127.

Tag synchronization menu 240 includes Display field 244, which lists potentially "in-focus" locatable subjects 113 (tagged subjects) of multi-subject data set 205. By default, the first two located locatable subjects 113 are listed as "Subject_A" and "Subject_B". Each additional located subject is assigned the next available identification letter as shown (at least embodying herein wherein such at least one user interface further comprises at least one user-selectable menu item enabling user-initiated acquisition of at least one of such first location data, such second location data, and other location data).

The user will be able to edit the default letter names assigned to the locator tags 116 by selecting the default letter designation of a displayed locator tag 116 and pressing the "Edit Beacon Name" menu item 246. The selected locator tag 116 is highlighted with a color, such as blue, indicating that the entry is available for editing. The user may then change the name so that instead of indicating a located subject as "Subject_A", the display entry will read as "Male_Actor", "John_Smith", "Red_Apple", etc. When "Edit Beacon Name" menu item 246 is selected, program 194 brings up a keyboard interface for ease of editing.

Display field 244 also shows distances of all locator tags 116 to camera 103 and battery power of all locator tags 116. Locator tags 116 detected as having below 25% battery power are highlighted with an alert color, such as red.

Figure 14:
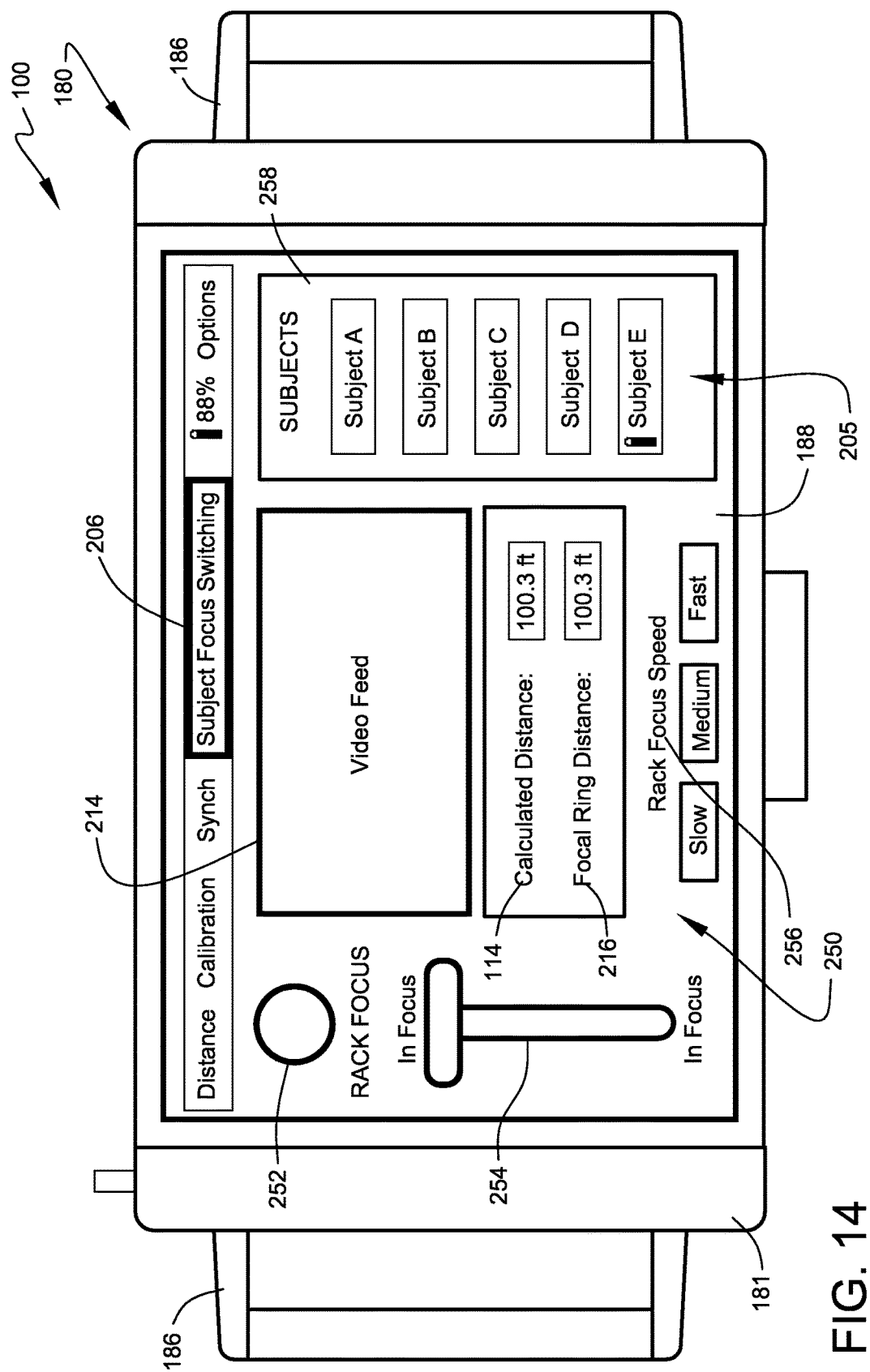
FIG. 14 shows a front view, illustrating the portable user interface of FIG. 9, displaying a subject focus switching menu, according to an embodiment of the disclosed subject matter.

User selection of "Subject focus switching" menu item 206 within the primary menu 196 results in the display of subject focus switching menu 250 on touch display screen 188, as shown in FIG. 14. FIG. 14 shows a front view, illustrating the portable user interface of FIG. 9, displaying subject focus switching menu 250, according to an embodiment of the disclosed subject matter.

Subject focus switching menu 250 comprises "Rack focus" menu item 252, digital focus speed slider 254, video window 214, distance display 114, lens setting display 216, "Rack Focus Speed Setting" menu item 256, and Subject List Window 258, as shown.

Subject List Window 258 displays a listing of two or more possible in-focus "tagged subjects" from the current multi-subject data-set 205. By default, the first two "tagged subjects" located by the system are listed as "Subject_A" and "Subject_B." The user is able to select which "tagged subject" will be placed in focus by touch screen selection of a subject listed within Subject List Window 258 (at least embodying herein at least one locatable-subject selector structured and arranged to enable user selecting of at least one such data entry of such at least one multi-subject data set).

By default, the first beacon to be activated and detected by the system is designated "Subject_A" and will be in focus. The "in-focus" subject will be identified in touch display screen 188 as the current "in-focus" subject by a green backlight.

The user can then select the next subject to be placed in focus, for example, by touching the menu item in Subject List Window 258 associated with "Subject_B". In an embodiment of the present system, program 194 does not immediately transition focus to "Subject_B" on the user's selection; rather, the system assigns "Subject_B" an "on deck" status. This "on deck" designation indicates that that a subject is selected and is ready to be the next subject the system will place "in-focus". An "on deck" subject is identified by a red backlight within subject List Window 258.

After the user has selected a subject to be "on deck" and touch display screen 188 has indicated the status of the "on deck" subject by a red backlight, the user can then activate a transition between the current "in-focus" subject and the "on deck" subject by touching the "Rack focus" menu item 252. Program 194 then signals the system to transition the camera focus from "Subject_A" to "Subject_B", using the current subject location profile for "Subject_B" (at least embodying herein at least one subject-focus transitioner structured and arranged to transition such focus state of such at least one image-capture device between such at least one first focus-setting profile generated for such at least one first locatable subject and such at least one other focus-setting profile generated for such at least one other locatable subject). The rate of transition is controlled by either the "Rack Focus Speed Setting" menu item 256 or the Digital focus speed slider 254. Both menu items control the rate at which the program switches between focus of two "tagged subjects". "Rack Focus Speed Setting" menu item 256 allows the generalized selections of "slow", medium", and "fast" transitions. Digital focus speed slider 254 is configured to allow manual control of the speed of the rack focus process (at least embodying herein wherein such at least one subject-focus transitioner comprises at least one user transition control structured and arrange to enable user control of a rate of change of such transition of such focus state).

In an embodiment of the present system, the ability to switch between "Subject_A" and "Subject_B" is also available by remote finger triggers 176 incorporated within handles 178 (see FIG. 1).

In addition, a low battery icon is provided in the Subject List Window 258 and will blink if a locator tag 116 is low on battery power. "Subject_E" is shown with a low battery icon illuminated.

Figure 15:
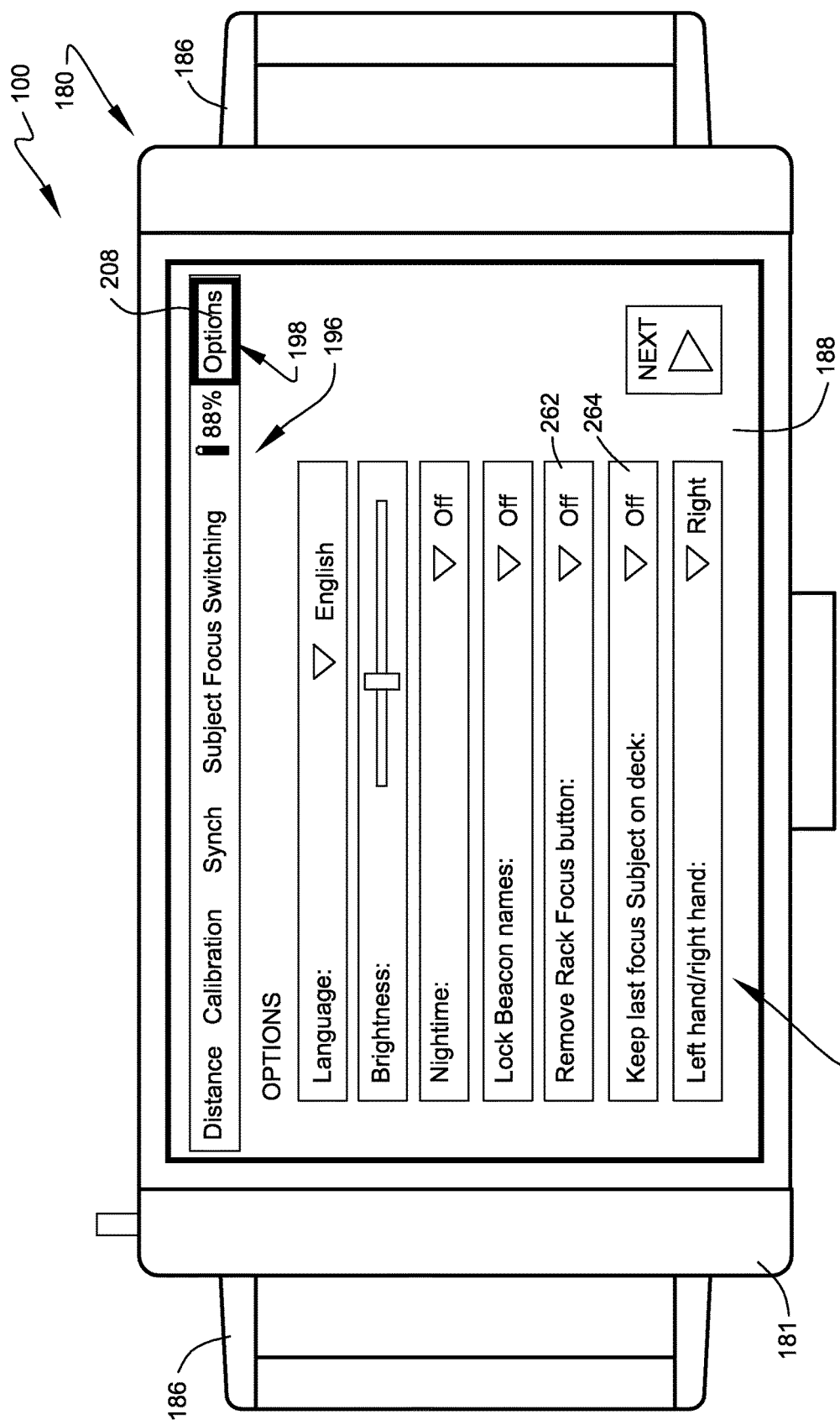
FIG. 15 shows a front view, illustrating the portable user interface of FIG. 9, displaying an options menu, according to an embodiment of the disclosed subject matter.

User selection of "Options" menu item 208 within the primary menu 196 results in the display of "Options" menu 260 touch display screen 188, as shown in FIG. 15. FIG. 15 shows a front view, illustrating the portable user interface 180 displaying "Options" menu 260, according to another embodiment of the disclosed subject matter.

Menu items within "Options" menu 260 enable the user to alter options within the menus. For example, options include selection of the displayed language, allowing the user to set the brightness of the display, allowing the user to choose a night time display color setting, allowing the user to prevent the editing of beacon names, etc.

In addition, menu item 262 within "Options" menu 260 allows the user to remove the "Rack focus" menu item 252 from Subject focus switching menu 250. This results in the immediate transitioning of focus to a new subject as soon as the subject is selected within Subject List Window 258 (see also FIG. 14). Menu item 264 within "Options" menu 260 results in the last subject to be focused on to automatically keep the last subject in focus to be automatically "on deck."

Other menu items within "Options" menu 260 include the ability to alter the organization of touch display screen 188 for left-handed users, monitor and modify feed options to define how the monitor feed from camera 103 is displayed, and select the language used in the interface. Upon reading this specification, those with ordinary skill in the art will appreciate that, under appropriate circumstances, considering such issues as design preference, user preferences, marketing preferences, cost, technological advances, etc., other options such as, for example, changing measurement between imperial and metric units, having the ability to store and retrieve setting for specific users, etc., may suffice.

Figure 16:
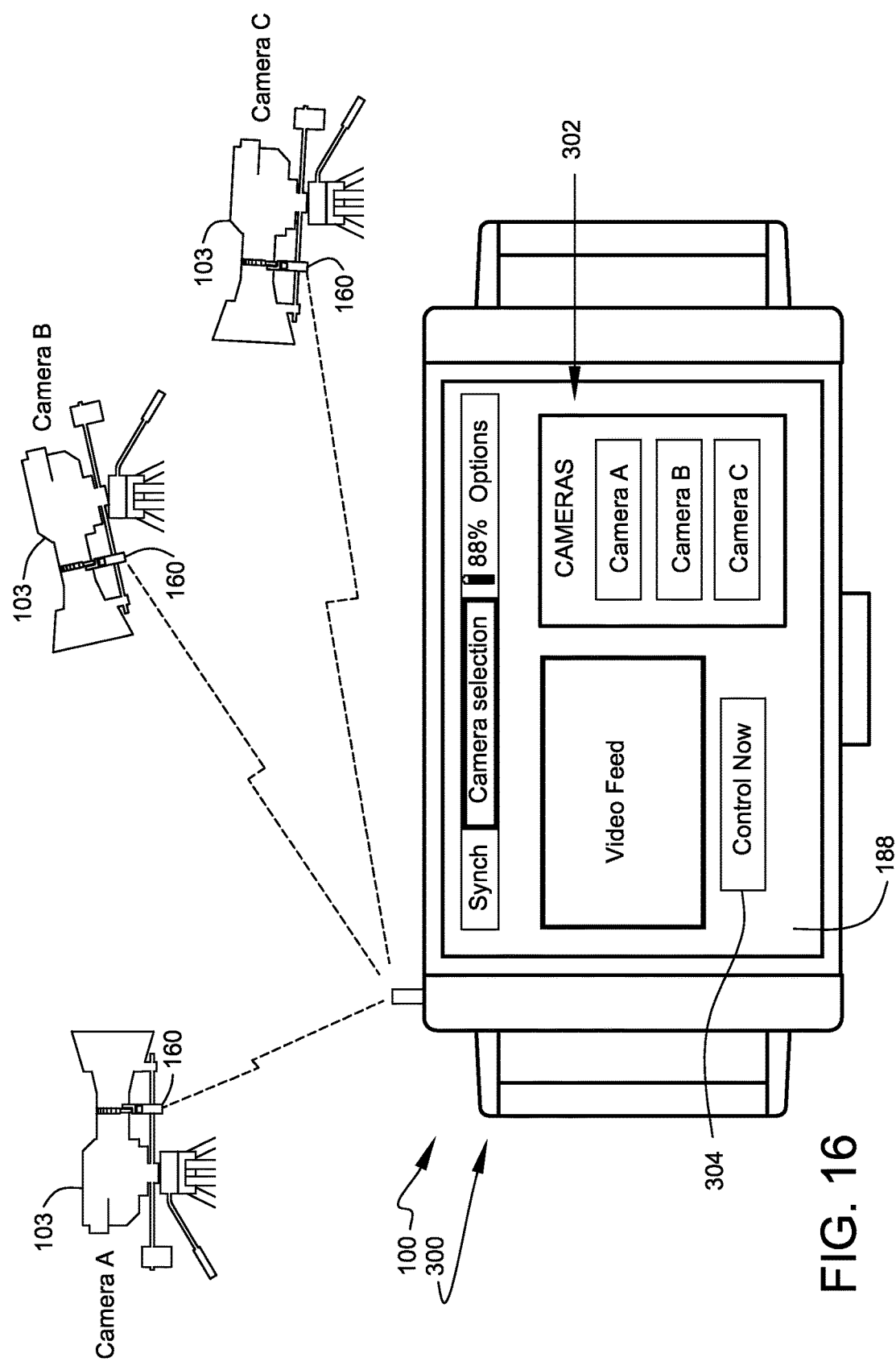
FIG. 16 shows a diagram, schematically illustrating a master controller configured to control a plurality of cameras from a central location, according to an embodiment of the disclosed subject matter.

FIG. 16 shows a diagram, schematically illustrating master controller 300 configured to control a plurality of cameras 103 from a central location, according to an embodiment of the disclosed subject matter. Master controller 300 is configured provide wireless control of two or more cameras 103 equipped with servo-operated focus assist devices 160. Master controller 300 (at least embodying herein at least one system controller structured and arranged to control multiple image-capture devices operating within such system) allows a single user to gain control of multiple cameras in a manner similar to the selecting of subjects in the above-described menus 196 of portable user interface 180. More specifically, master controller 300 comprises a touch display screen 188 and menu 302 listing selectable cameras 103 under the control of the device. Once selected, a camera is then "on-deck" and the selected camera name is backlit by a green color. The user can then switch to the selected camera by pressing a "Control now" menu item 304. When a camera is under control of the user, it is backlit by red. Multiple cameras 103 can also be controlled at the same time, allowing multiple cameras 103 to focus on the same subject all at once. This allows for one user to be able to conduct focusing for several cameras 103. Once a camera is selected, the system program may display control menus similar to those implemented in the above-described portable user interface 180.

It is noted that the disclosed embodiments of portable user interface 180 and master controller 300 are implemented using a portable computing device, such as, for example an iPad® tablet produced by the Apple Corporation of North America. In an embodiment, processor 126, memory 127, and user interface 124 are components of the tablet device and interoperate with one or more applications programs 194 executed within the tablet device.

In reference to the teachings contained herein, camera focusing system 100 comprises a method relating to generating, for at least one camera 103, focus-setting data associated with one or more locatable subjects 113 to be captured, such focus-setting data usable to control the focus state of camera 113. In that regard the method of camera focusing system 100 includes the steps of providing at least one locator tag 116 structured and arranged to generate first location data associated with a current location of a tagged subject associated with such locator tag 116; providing at least one camera locator 120 structured and arranged to generate second location data associated with a current location of camera 103; providing at least one computing device (i.e., distance computation unit 112, or distance computation unit 161, or portable user interface 180, or master controller 300), such computing device structured and arranged to calculate a current distance between locatable subjects 113 and an imager focus point 122 of camera 103; generating such current distance using such first location data and such second location data; providing at least one distance display 114 configured to display the calculated current distance; and providing at least one follow-focus device (i.e., focus assist device 102 or servo-operated focus assist device 160) structured and arranged to manipulate at least one focus ring of camera lens 105 to assist in establishing, within camera 103, a focus state appropriate to the imaging of the subjects to be captured. In addition, the above method further comprises manipulating such focus ring of camera lens 105 in response to the calculated current distance displayed; wherein such locator tag comprises at least one first wireless communicator structured and arranged to wirelessly communicate such first location data.

Although applicant has described applicant's embodiments of the disclosed subject matter, it will be understood that the broadest scope of this subject matter includes modifications such as diverse shapes, sizes, and materials.

What is claimed is:

1. A system relating to generating, for at least one image-capture device, focus-setting data associated with one or more subjects to be captured, the focus-setting data usable to control the focus state of the at least one image-capture device, the system comprising:
 a. at least one first location-data generator structured and arranged to generate first location data associated with a current location of at least one first locatable subject;
 b. at least one second location-data generator structured and arranged to generate second location data associated with a current location of the at least one image-capture device;
 c. at least one distance calculator structured and arranged to calculate a current distance between the first locatable subject and an imager focus point of the at least one image-capture device, wherein the at least one distance calculator is configured to generate the current distance using the first location data and the second location data;
 d. wherein the at least one first location data generator comprises at least one first wireless communicator structured and arranged to wirelessly communicate the first location data; and
 e. wherein the at least one distance calculator comprises:
  i. at least one second wireless communicator structured and arranged to acquire the first location data by wirelessly communicating with the at least one first wireless communicator; and
  ii. at least one distance-data communicator structured and arranged to communicate the calculated distance to at least one image-focus effector controlling the focus state of the at least one image-capture device;

iii. at least one multi-subject data-set, each data entry of the at least one multi-subject data set identifying one locatable subject of a set comprising multiple locatable subjects;

iv. at least one subject-profile generator structured and arranged to generate at least one focus-setting profile for each of the data entry of the at least one multi-subject data set;

v. at least one locatable-subject selector structured and arranged to enable user selecting of at least one the data entry of the at least one multi-subject data set;

vi. wherein each selected the at least one focus-setting profile is usable by the at least one image-focus effector to control the focus state of the at least one image-capture device;

vii. a storage memory structured and arranged to store a plurality of calibration records, each the calibration record comprising data entries associated with at least one hardware configuration of the at least one image-capture device;

viii. at least one calibration user interface structured and arranged to assist user retrieval of a selected one of the plurality of saved calibration records;

ix. wherein each one of the calibration records contains at least one data entry selected from the group consisting essentially of:
  a. lens F-stop range;
  b. lens focal-length range; and
  c. lens focus adjustment range; and x. wherein the calibration records are usable by the at least one image-focus effector to control the focus state of the at least one image-capture device.

2. The system according to claim 1 wherein the at least one distance data communicator comprises at least one distance-data display configured to display the calculated current distance.

3. The system according to claim 2 further comprising at least one distance-display supporter structured and arranged to support the at least one distance data display adjacent the at least one image-capture device.

4. The system according to claim 3 further comprising at least one follow-focus device structured and arranged to manipulate at least one focus ring of the at least one image-capture device to assist in establishing, within the at least one image-capture device, a focus state appropriate to the imaging of the subjects to be captured.

5. The system according to claim 4 wherein the at least one distance-display supporter is configured to support the at least one distance-data display from the at least one follow-focus device.

6. The system according to claim 1 wherein:
a. the at least one first location-data generator comprises at least one Radio-frequency Identification (RFID) tag structured and arranged to wirelessly transmit at least one first radio signal from which the first location data is derivable; and
b. the at least one second location-data generator comprises at least one RFID signal receiver structured and arranged to receive the at least one first radio signal.

7. The system according to claim 1 wherein:
a. the at least one first location-data generator comprises:
  i. at least one first Global Positioning System (GPS) receiver structured and arranged to receive GPS signal data associated with the current location of the at least one first locatable subject;
  ii. at least one first GPS signal-data processor structured and arranged to process the GPS signal data to form the first location data; and
  iii. at least one first wireless transmitter structured and arranged to wirelessly transmit the first location data;
b. the at least one second location-data generator comprises at least one second GPS receiver structured and arranged to receive GPS signal data associated with the current location of the at least one image-capture device; and
c. the at least one distance calculator comprises at least one wireless data receiver structured and arranged to wirelessly receive the first location data.

8. The system according to claim 1 wherein the at least one distance calculator comprises at least one focus-setting acquisition component structured and arranged to acquire at least one current image-focus configuration of the at least one image-capture device.

9. The system according to claim 8 wherein the at least one distance calculator further comprises at least one focus-setting display structured and arranged to display the at least one current image-focus configuration of the at least one image-capture device.

10. The system according to claim 8 wherein the at least one focus-setting acquisition component is configured to acquire at least one current image-focus configuration selected from the group consisting essentially of a current lens F-stop setting and a current lens focal length.

11. The system according to claim 1 wherein:
a. the at least one distance calculator further comprises at least one subject-profile generator structured and arranged to generate at least one first focus-setting profile for the at least one first subject;
b. wherein the at least one subject-profile generator generates the at least one first focus-setting profile using the first location data, the second location data, and the at least one current image-focus configuration; and
c. wherein the generated at least one first focus-setting profile is usable by the at least one image-focus effector to control the focus state of the at least one image-capture device.

12. The system according to claim 11, wherein:
a. the at least one image-focus effector comprises at least one servomotor-operated follow-focus device structured and arranged to automatically manipulate a focus ring of the at least one image-capture device; and
b. the at least one image-focus effector is configured to assist in establishing, within the at least one image-capture device, a focus state appropriate to the imaging of the subjects to be captured in response to the generated at least one first focus-setting profile.

13. The system according to claim 12 wherein the at least one servomotor-operated follow-focus device further comprises:
a. at least one manually-operated focus control configured to enable manual adjustments of the focus state;
b. at least one manual manipulation detector structured and arranged to detect manual-adjustment inputs; and
c. at least one servomotor override to override the automatic operation of the at least one servomotor-operated follow-focus device on detection of at least one manual manipulation of the at least one manually-operated focus control.

14. The system according to claim 1 wherein the at least one distance calculator further comprises at least one subject-focus transitioner structured and arranged to transition the focus state of the at least one image-capture device between the at least one first focus-setting profile generated for the at least one first locatable subject and at least one other focus-setting profile generated for the at least one other locatable subject.

15. The system according to claim 14 wherein the at least one subject-focus transitioner comprises at least one user transition control structured and arrange to enable user control of a rate of change of the transition of the focus state.

16. The system according to claim 15 wherein the at least one distance calculator further comprises:
   a. at least one computing device, comprising:
      i. at least one user interface;
      ii. at least one processor; and
      iii. memory; and
   b. at least one program, wherein the at least one program is stored in the memory and configured to be executed by the at least one processor, the at least one program comprising instructions for:
      i. displaying at least one menu on the at least one user interface, the at least one menu comprising at least one user-selectable menu item; and
      ii. receiving at least one user input corresponding to at least one of the at least one user-selectable menu items.

17. The system according to claim 16 wherein the at least one program further comprises instructions for the at least one distance calculator to automatically seek locatable subjects.

18. The system according to claim 16 wherein the at least one user interface comprises at least one touch-sensitive display.

19. The system according to claim 16 wherein the at least one user interface comprises at least one current image window configured to display at least one current image captured by the at least one image-capture device.

20. The system according to claim 16 wherein the at least one user interface further comprises:
   a. at least one user-selectable menu item enabling the at least one calibration user interface; and
   b. wherein the at least one user-selectable menu item enabling the at least one calibration user interface comprises at least one at least one user-selectable menu item enabling manual input of at least one hardware configuration of the at least one image-capture device.

21. The system according to claim 16 wherein the at least one user interface further comprises at least one user-selectable menu item enabling user-initiated acquisition of at least one of the first location data and the second location data.

22. The system according to claim 16 wherein the at least one user interface further comprises at least one user-selectable menu item enabling user associating of a locatable subject with at least one user-selected name.

23. The system according to claim 16 wherein the at least one user interface further comprises at least one user-selectable menu item enabling operation of the at least one subject-focus transitioner.

24. The system according to claim 23 wherein the at least one user interface further comprises at least one user-selectable menu item enabling operation of the at least one user transition control.

25. The system according to claim 1 wherein the at least one computing device comprises at least one portable computing device.

26. The system according to claim 25 further comprising at least one system controller structured and arranged to control multiple image-capture devices operating within the system.

27. The system according to claim 1 wherein the at least one image-capture device is a video camera.

28. The system according to claim 1, wherein:
   a. the at least one first location-data generator comprises at least one ultra-wideband tag structured and arranged to wirelessly transmit at least one first radio signal from which the first location data is derivable; and
   b. the at least one second location-data generator comprises at least one ultra-wideband receiver structured and arranged to receive the at least one first radio signal.

29. A system relating to generating, for at least one image-capture device, focus-setting data associated with one or more subjects to be captured, the focus-setting data usable to control the focus state of the at least one image-capture device, the system comprising:
   a. at least one locator tag structured and arranged to generate first location data associated with a current location of a tagged subject associated with the at least one locator tag;
   b. at least one image-device locator structured and arranged to generate second location data associated with a current location of the at least one image-capture device;
   c. at least one computing device structured and arranged to calculate a current distance between the locatable subject and an imager focus point of the at least one image-capture device, wherein the at least one distance calculator is configured to generate the current distance using the first location data and the second location data;
   d. at least one distance-data display configured to display the calculated current distance;
   e. at least one follow-focus device structured and arranged to manipulate at least one focus ring of the at least one image-capture device to assist in establishing, within the at least one image-capture device, a focus state appropriate to the imaging of the subjects to be captured;
   f. wherein the at least one locator tag comprises at least one first wireless communicator structured and arranged to wirelessly communicate the first location data;
   g. wherein the at least one computing device comprises at least one second wireless communicator structured and arranged to acquire the first location data by wirelessly communicating with the at least one first wireless communicator; and
   h. wherein the at least one distance calculator further comprises:
      i. at least one multi-subject data-set, each data entry of the at least one multi-subject data set identifying one locatable subject of a set comprising multiple locatable subjects;
      ii. at least one subject-profile generator structured and arranged to generate at least one focus-setting profile for each the data entry of the at least one multi-subject data set;
      iii. at least one locatable-subject selector structured and arranged to enable user selecting of at least one the data entry of the at least one multi-subject data set;

iv. wherein each selected the at least one focus-setting profile is usable by the at least one image-focus effector to control the focus state of the at least one image-capture device;
v. a storage memory structured and arranged to store a plurality of calibration records, each the calibration record comprising data entries associated with at least one hardware configuration of the at least one image-capture device;
vi. at least one calibration user interface structured and arranged to assist user retrieval of a selected one of the plurality of saved calibration records;
vii. wherein each one of the calibration records contains at least one data entry selected from the group consisting essentially of:
  a. lens F-stop range;
  b. lens focal-length range; and
  c. lens focus adjustment range; and
viii. wherein the calibration records are usable by the at least one image-focus effector to control the focus state of the at least one image-capture device.

30. The system according to claim 29 further comprising:
a. at least one focus-setting acquisition component structured and arranged to acquire at least one current image-focus configuration of the at least one image-capture device; and
b. at least one focus-setting display structured and arranged to display the at least one current image-focus configuration of the at least one image-capture device.

31. The system according to claim 30 wherein the at least one subject-profile generator generates the at least one focus-setting profile using the first location data, the second location data, and the at least one current image-focus configuration.

32. The system according to claim 31 further comprising:
a. at least one servomotor-operated follow-focus device structured and arranged to automatically manipulate a focus ring of the at least one image-capture device;
b. wherein at least one servomotor-operated follow-focus device is controlled by the at least one computing device; and
c. wherein the at least one servomotor-operated follow-focus device is configured to assist in establishing, within the at least one image-capture device, a focus state appropriate to the imaging of the subjects to be captured.

33. The system according to claim 32 wherein the at least one computing device further comprises:
a. at least one user interface;
b. at least one processor;
c. memory; and
d. at least one program, wherein the at least one program is stored in the memory and configured to be executed by the at least one processor, the at least one program comprising instructions for:
  i. displaying at least one menu on the at least one user interface, the at least one menu comprising at least one user-selectable menu item; and
  ii. receiving at least one user input corresponding to at least one of the at least one user-selectable menu items.

34. The system according to claim 33 wherein the at least one user interface comprises at least one touch-sensitive display.

35. The system according to claim 33 wherein the at least one computing device communicates with the at least one servomotor-operated follow-focus device wirelessly.

36. A method relating to generating, for at least one image-capture device, focus-setting data associated with one or more subjects to be captured, the focus-setting data usable to control the focus state of the at least one image-capture device, the method comprising the steps of:
a. providing at least one locator tag structured and arranged to generate first location data associated with a current location of a tagged subject associated with the at least one locator tag;
b. providing at least one image-device locator structured and arranged to generate second location data associated with a current location of the at least one image-capture device;
c. providing at least one computing device structured and arranged to calculate a current distance between the locatable subject and an imager focus point of the at least one image-capture device;
d. generating the current distance using the first location data and the second location data;
e. providing at least one distance-data display configured to display the calculated current distance;
f. providing at least one follow-focus device structured and arranged to manipulate at least one focus ring of the at least one image-capture device to assist in establishing, within the at least one image-capture device, a focus state appropriate to the imaging of the subjects to be captured;
g. manipulating the at least one focus ring of the at least one image-capture in response to the calculated current distance displayed;
h. wherein the at least one locator tag comprises at least one first wireless communicator structured and arranged to wirelessly communicate the first location data;
i. wherein the at least one computing device comprises at least one second wireless communicator structured and arranged to acquire the first location data by wirelessly communicating with the at least one first wireless communicator; and
j. wherein the at least one distance calculator further comprises:
  a. at least one multi-subject data-set, each data entry of the at least one multi-subject data set identifying one locatable subject of a set comprising multiple locatable subjects;
  b. at least one subject-profile generator structured and arranged to generate at least one focus-setting profile for each the data entry of the at least one multi-subject data set;
  c. at least one locatable-subject selector structured and arranged to enable user selecting of at least one the data entry of the at least one multi-subject data set;
  d. wherein each selected the at least one focus-setting profile is usable by the at least one image-focus effector to control the focus state of the at least one image-capture device;
  e. a storage memory structured and arranged to store a plurality of calibration records, each the calibration record comprising data entries associated with at least one hardware configuration of the at least one image-capture device;
  f. at least one calibration user interface structured and arranged to assist user retrieval of a selected one of the plurality of saved calibration records;
  g. wherein each one of the calibration records contains at least one data entry selected from the group consisting essentially of:

i. lens F-stop range;
ii. lens focal-length range; and
iii. lens focus adjustment range; and
h. wherein the calibration records are usable by the at least one image-focus effector to control the focus state of the at least one image-capture device.

* * * * *